US009088046B2

(12) United States Patent
Whitacre

(10) Patent No.: US 9,088,046 B2
(45) Date of Patent: Jul. 21, 2015

(54) SODIUM BASED AQUEOUS ELECTROLYTE ELECTROCHEMICAL SECONDARY ENERGY STORAGE DEVICE

(75) Inventor: Jay Whitacre, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 12/943,275

(22) Filed: Nov. 10, 2010

(65) Prior Publication Data

US 2011/0052945 A1   Mar. 3, 2011

Related U.S. Application Data

(62) Division of application No. 12/385,277, filed on Apr. 3, 2009.

(60) Provisional application No. 61/123,230, filed on Apr. 7, 2008, provisional application No. 61/129,257, filed on Jun. 13, 2008, provisional application No. 61/154,156, filed on Feb. 20, 2009.

(51) Int. Cl.
H01M 4/505 (2010.01)
H01M 12/00 (2006.01)
H01G 11/06 (2013.01)
(Continued)

(52) U.S. Cl.
CPC .............. H01M 4/505 (2013.01); H01G 11/06 (2013.01); H01G 11/46 (2013.01); H01G 11/62 (2013.01); H01M 12/005 (2013.01); H01M 4/582 (2013.01); H01M 4/5815 (2013.01);
(Continued)

(58) Field of Classification Search
CPC ....... H01G 11/06; H01G 11/46; H01G 11/02; H01M 4/505; H01M 4/5815; H01M 4/582; H01M 4/5825; H01M 2300/0002
USPC ............. 429/231.1, 231.8, 231.9, 231.95, 20, 429/188; 29/25.03
IPC H01M 10/36, 10/38, 16/00, 4/58; H01G 9/145, H01G 9/155, 9/00
See application file for complete search history.

(56) References Cited

U.S. PATENT DOCUMENTS 4,246,253 A   1/1981   Hunter
5,316,877 A   5/1994   Thackeray et al.
(Continued)

FOREIGN PATENT DOCUMENTS

CN   1674347 A   9/2005
CN   101154745 A   4/2008
(Continued)

OTHER PUBLICATIONS

Doeff (J. Electrochem. Soc, 1994, 141 L145-L147).*
(Continued)

Primary Examiner — Jun Li
(74) Attorney, Agent, or Firm — The Marbury Law Group PLLC

(57) ABSTRACT

A secondary hybrid aqueous energy storage device includes an anode electrode, a cathode electrode which is capable of reversibly intercalating sodium cations, a separator, and a sodium cation containing aqueous electrolyte, wherein an initial active cathode electrode material comprises an alkali metal containing active cathode electrode material which deintercalates alkali metal ions during initial charging of the device.

1 Claim, 21 Drawing Sheets

(51) Int. Cl.
*H01G 11/46* (2013.01)
*H01G 11/62* (2013.01)
*H01M 4/58* (2010.01)

(52) U.S. Cl.
CPC ..... *H01M4/5825* (2013.01); *H01M 2300/0002* (2013.01); *Y02E 60/122* (2013.01); *Y02E 60/13* (2013.01)

(56) References Cited

U.S. PATENT DOCUMENTS

| | | | |
|---|---|---|---|
| 5,525,442 | A | 6/1996 | Shuster |
| 5,558,961 | A | 9/1996 | Doeff et al. |
| 5,958,624 | A | 9/1999 | Frech et al. |
| 5,963,417 | A | 10/1999 | Anderson et al. |
| 6,017,654 | A | 1/2000 | Kumta et al. |
| 6,040,089 | A | 3/2000 | Manev et al. |
| 6,159,637 | A | 12/2000 | Shizuka et al. |
| 6,248,477 | B1 | 6/2001 | Howard, Jr. et al. |
| 6,267,943 | B1 | 7/2001 | Manev et al. |
| 6,322,744 | B1 | 11/2001 | Kelley et al. |
| 6,325,988 | B1 | 12/2001 | Inoue et al. |
| 6,383,683 | B1 | 5/2002 | Nagayama et al. |
| 6,413,673 | B1 | 7/2002 | Kasai et al. |
| 6,423,294 | B2 | 7/2002 | Manev et al. |
| 6,465,129 | B1 | 10/2002 | Xu et al. |
| 6,465,130 | B1 | 10/2002 | Numata et al. |
| 6,531,220 | B1 | 3/2003 | Kweon et al. |
| 6,599,662 | B1 | 7/2003 | Chiang et al. |
| 6,670,076 | B1 | 12/2003 | Iwata et al. |
| 6,673,491 | B2 | 1/2004 | Shirakawa et al. |
| 6,692,665 | B2 | 2/2004 | Shima et al. |
| 6,783,893 | B2 | 8/2004 | Bowden et al. |
| 6,787,232 | B1 | 9/2004 | Chiang et al. |
| 6,814,894 | B2 | 11/2004 | Shoji et al. |
| 6,869,547 | B2 | 3/2005 | Barker et al. |
| 6,872,492 | B2 | 3/2005 | Barker et al. |
| 7,008,726 | B2 | 3/2006 | Adamson et al. |
| 7,041,239 | B2 | 5/2006 | Barker et al. |
| 7,056,486 | B2 | 6/2006 | Park et al. |
| 7,087,346 | B2 | 8/2006 | Barker et al. |
| 7,199,997 | B1 | 4/2007 | Lipka et al. |
| 7,214,448 | B2 | 5/2007 | Barker et al. |
| 7,335,444 | B2 | 2/2008 | Numata et al. |
| 2002/0009645 | A1 | 1/2002 | Shima et al. |
| 2002/0048706 | A1 | 4/2002 | Mayes et al. |
| 2002/0182502 | A1 | 12/2002 | Park et al. |
| 2003/0035999 | A1 | 2/2003 | Gao et al. |
| 2003/0186128 | A1 | 10/2003 | Singh et al. |
| 2003/0190528 | A1 | 10/2003 | Saidi et al. |
| 2004/0191627 | A1 | 9/2004 | Takahashi et al. |
| 2004/0262571 | A1 | 12/2004 | Barker et al. |
| 2005/0181280 | A1 | 8/2005 | Ceder et al. |
| 2005/0181283 | A1 | 8/2005 | Pugh et al. |
| 2005/0238961 | A1 | 10/2005 | Barker et al. |
| 2006/0019166 | A1 | 1/2006 | Numata et al. |
| 2006/0035151 | A1 | 2/2006 | Kumeuchi et al. |
| 2006/0154071 | A1* | 7/2006 | Homma et al. ............... 428/403 |
| 2006/0263688 | A1 | 11/2006 | Guyomard et al. |
| 2007/0072034 | A1 | 3/2007 | Barker et al. |
| 2008/0008937 | A1 | 1/2008 | Eylem et al. |
| 2008/0158778 | A1 | 7/2008 | Lipka et al. |
| 2009/0053613 | A1 | 2/2009 | Inoue et al. |

FOREIGN PATENT DOCUMENTS

| | | | |
|---|---|---|---|
| CN | 101154745 | A | 4/2008 |
| CN | 101241802 | | 8/2008 |
| JP | 51140138 | * 12/1976 | ............... H01M 2/14 |
| JP | 2000331682 | A | 11/2000 |
| JP | 2003-086179 | A | 3/2003 |
| KR | 10-2001-0024357 | A | 3/2001 |
| KR | 10-2007-0100918 | A | 10/2007 |
| WO | WO 2006/111079 | | 10/2006 |
| WO | WO 2006/111079 | A1 | 10/2006 |

OTHER PUBLICATIONS

Li et al (CN101154745A) (English translation of CN101154745A has been provided hereof), publication date Apr. 2, 2008.*
Partial translation of JP51-14013, publication date Dec. 1976.*
Athouel et al., "Bimessite as possible candidate for hybrid carbon/ $MnO_2$ electrochemical capacitor," Abstract from 214th ECS Meeting, Honolulu, HI, Oct. 12-17, 2008, 1 page.
Komaba et al., "Enhanced Supercapacitive Behaviors of Bimessite Type Manganese Dioxide," Abstract from 214th ECS Meeting, Honolulu, HI, Oct. 12-17, 2008, 1 page.
Wang et al., "A new concept hybrid electrochemical supercapacitor: Carbon/$LiMn_2O_4$ aqueous system," Electrochemistry Communications, 2005, 7:1138-1142.
Akimoto et al., "Synthesis and Electrochemical Properties of $Li_{0.44}MnO_2$ as a Novel 4 V Cathode Material," Electrochemical and Solid-State Letters, 2005, 8(10):A554-A557.
Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.
Alcantara et al., "$NiCo_2O_4$ Spinel: First Report on a Transition Metal Oxide for the Negative Electrode of Sodium-Ion Batteries," Chem. Mater., 2002, 14:2847-2848.
Bordet-Le Geunne et al., "Structural study of two layered phases in the $Na_xMn_yO_2$ system. Electrochemical behavior of their lithium substituted derivatives," J. Mater. Chem., 2000, 10:2201-2206.
Brousse et al., "A Hybrid Activated Carbon-Manganese Dioxide Capacitor using a Mild Aqueous Electrolyte," Journal of the Electrochemical Society, 2004, 151(4):A614-A622.
Cvjeticanin et al., "Cyclic voltammetry of $LiCr_{0.15}Mn_{1.85}O_4$ in an aqueous $LiNO_3$ solution," Journal of Power Sources, 2007, 174:1117-1120.
Doeff et al., "A High-Rate Manganese Oxide for Rechargeable Lithium Battery Applications," Journal of the Electrochemical Society, 2001, 148(3):A230-A236.
Doeff et al., "Electrochemical and structural characterization of titanium-substituted manganese oxides based on $Na_{0.44}MnO_2$," Journal of Power Sources, 2004, 125:240-248.
Doeff et al., "Lithium Insertion Processes of Orthorhombic $Na_xMnO_2$-Based Electrode Materials," J. Electrochem. Soc., Aug. 1996, 143(8):2507-2516.
Doeff et al., "Synthesis and characterization of a copper-substituted manganese oxide with the $Na_{0.44}MnO_2$ structure," Journal of Power Sources, 20002, 112:294-297.
Eftekhari et al., "Effect of Na diffusion on the formation of fibrous microcrystals of manganese oxide," Materials Research Bulletin, 2005, 40:2205-2211.
Feng et al., "Hydrothermal Soft Chemical Synthesis of Tunnel Manganese Oxides with Na + as Template," Chemistry Letters, 2000:284-285.
Huang et al., "Kinetics of Electrode Processes of $LiFePO_4$ in Saturated Lithium Nitrate Solution," Acta Phys.-Chim. Sin., 2007, 23(1):129-133.
Jin et al., "Hybrid supercapacitor based on $MnO2$ and columned FeOOH using $Li_2SO_4$ electrolyte solution," Journal of Power Sources, 2008, 175:686-691.
Kanoh et al., "Electrochemical Intercalation of Alkali-Metal Ions into Bimessite-Type Manganese Oxide in Aqueous Solution," Langmuir, 1997, 13:6845-6849.
Kanoh et al., "Equilibrium Potentials of Spinel-Type Manganese Oxide in Aqueous Solutions," J. Electrochem. Soc., Nov. 1993, 140(11):3162-3166.
Kim et al., "Electrochemical properties of sodium/pyrite battery at room temperature," Journal of Power Sources, 2007, 174:1275-1278.
Kim et al., "Ionic conductivity of sodium ion with $NaCF_3SO_3$ salts in electrolyte for sodium batteries," Materials Science Forum, 2005, 486-487:638-641.
Li et al., "A study of nitroxide polyradical/activated carbon composite as the positive electrode material for electrochemical hybrid capacitor," Electrochimica Acta, 2007, 52:2153-2157.
Li et al., "Rechargeable Lithium Batteries with Aqueous Electrolytes," Science, May 20, 1994, 264:1115-1118.

(56) References Cited

OTHER PUBLICATIONS

Ma et al., "A novel concept of hybrid capacitor based on manganese oxide materials," Electrochemistry Communications, 2007, 9:2807-2811.

Mi et al., "Electrochemical behaviors of solid $LiFePO_4$ and $Li_{0.99}Nb_{0.01}FePO_4$ in $Li_2SO_4$ aqueous electrolyte," Journal of Electroanalytical Chemistry, 2007, 602:245-254.

Park et al., "A Study of Copper as a Cathode Material for an Ambient Temperature Sodium Ion Batter," Journal of the Electrochemical Society, 2001, 148(12):A1346-A1351.

Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.

Rydh et al., "Energy analysis of batteries in photovoltaic systems. Part I: Performance and energy requirements," Energy Conversion and Management, 2005, 46:1957-1979.

Rydh et al., "Energy analysis of batteries in photovoltaic systems. Part II: Performance and energy requirements," Energy Conversion and Management, 2005, 46:1980-2000.

Sauvage et al., "Study of the Insertion/Deinsertion Mechanism of Sodium into $Na_{0.44}MnO_2$," Inorganic Chemistry, 2007, 46:3289-3294.

Sauvage et al., "Study of the potentiometric response towards sodium ions of $Na_{0.44-x}MnO_2$ for the development of selective sodium ion sensors," Sensors and Actuators B, 2007, 120:638-644.

Spahr et al., "Electrochemical insertion of lithium, sodium, and magnesium in molybdenum(VI) oxide," Journal of Power Sources, 1995, 54:346-351.

Su et al., "Symmetric Self-Hybrid Supercapacitor Consisting of Multiwall Carbon Nanotubes and Co-Al Layered Double Hydroxides," Journal of the Electrochemical Society, 2008, 155(2):A110-A114.

Tani et al,. "Alkali Metal Ion-Selective Electrodes Based on Relevant Alkali Metal Ion Doped Manganese Oxides," Mikrochim. Acta 1998, 129:81-90.

Wang et al., "Improvement of cycle performance of lithium ion cell $LiMn_2O_4/Li_xV_2O_5$ with aqueous solution electrolyte by polypyrrole coating an anode," Electrochimica Acta, 2007, 52:5102-5107.

Yang et al., "Interfacial synthesis of porous $MnO_2$ and its application in electrochemical capacitor," Electrochimica Acta, 2007, 53:752-757.

Zhuo et al., "The preparation of $NaV_{1-x}Cr_xPO_4F$ cathode materials or sodium-ion battery," Journal of Power Sources, 2006, 160:698-703.

Imanishi et al., "Study on electrochemical sodium deintercalation of $\alpha$-$Na_xFeO_2$," Denki Kagaku, 1993, 61(12):1451-1452.

International Search Report and Written Opinion mailed Nov. 13, 2009 in PCT/US2009/039436, 8 pages.

International Preliminary Report on Patentability, PCT/US2009/039436. WIPO, Oct. 21, 2010, 5pgs.

Brousse et al. (Journal of Electrochemical Society, 2006: 153, A2171-A2180).

Renuka et al. (Journal of Power Sources, 2000, 87: 144-152).

Toupin et al. (Chemistry of Materials, 2004, 16: 3184-3190).

Tevar, et al. (214th ECS Meeting, Abstract #642, The Electrochemical Society).

Whitacre, et al. (Electrochemistry Communications, 2010, 12: 463-466).

European Supplemental Search Report, for corresponding European Application No. 09730906.6, corresponding to PCT/US2009/039436, dated Sep. 5, 2014.

* cited by examiner

De-Lithiated Al-Doped λ-MnO2, Dense AC (0.56 g/cm^3)
Cycled in 1 M Na2SO4,
CV Analyses; 0.5 mV/Sec
(Data shown after 10 conditioning cycles in μelectrode Config)

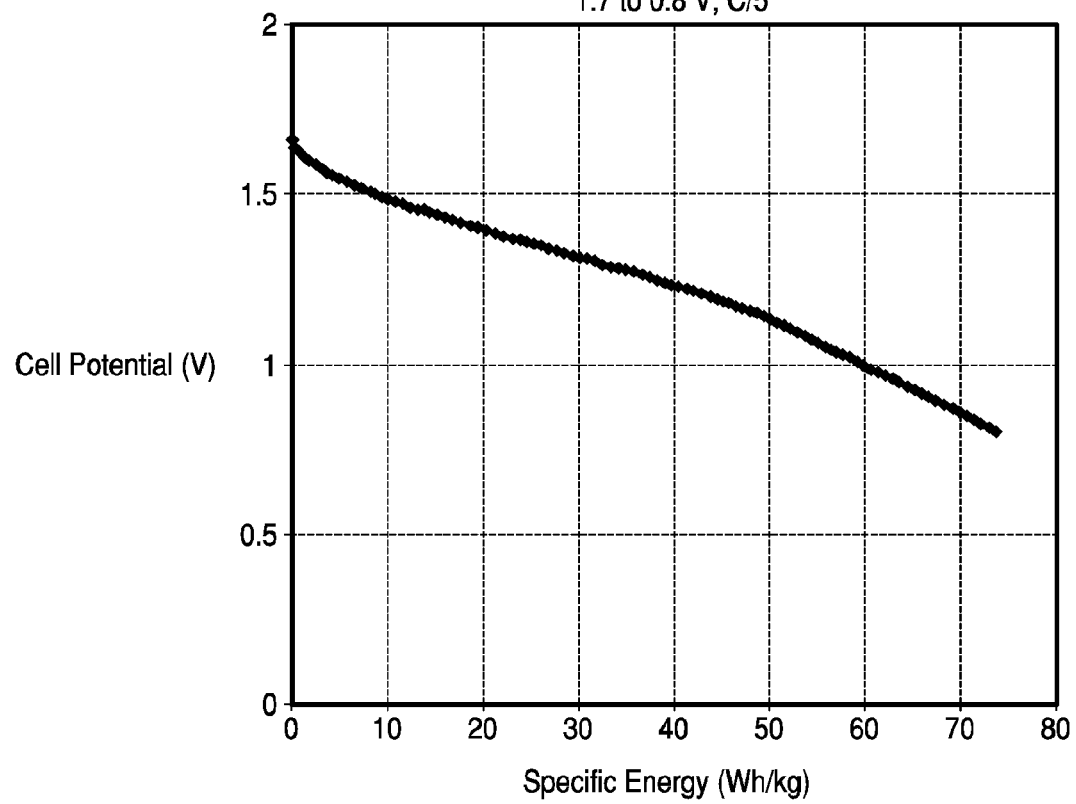

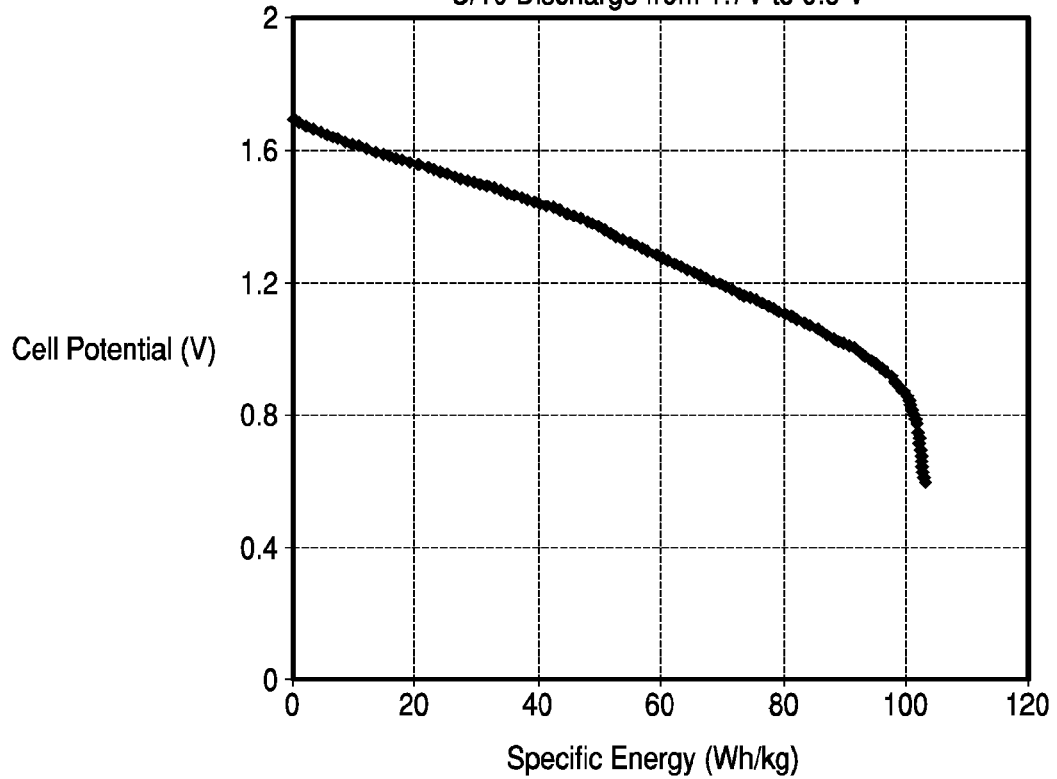

Cycling of Al-doped Spinel NaMn2O4 made via Electrochemical Li/Na ion exchange in Fresh Na2SO4 Aqueous electrolyte Cycling of Al-doped λ-MnO2 (fully de-lithiated Al-doped spinel LiMn2O4) in Fresh Na2SO4 Aqueous electrolyte
0.5 mA charge/discharge current    Cathode mass < 0.05 g Large Cell build 1: 2 Cell Stack
Cathode: Al-doped CSMO, Anode: Activated Carbon
Electrolyte 1 M Na2SO4
10 mA Discharge/Charge Long Term Cycling test:
$Na_{0.44}MnO_2/Na_2SO_4(aq)$ / Activated Carbon Cycle Life Under ~2C charge/discharge
$Na_{0.44}MnO_2/Na_2SO_4(aq)$ / Activated Carbon

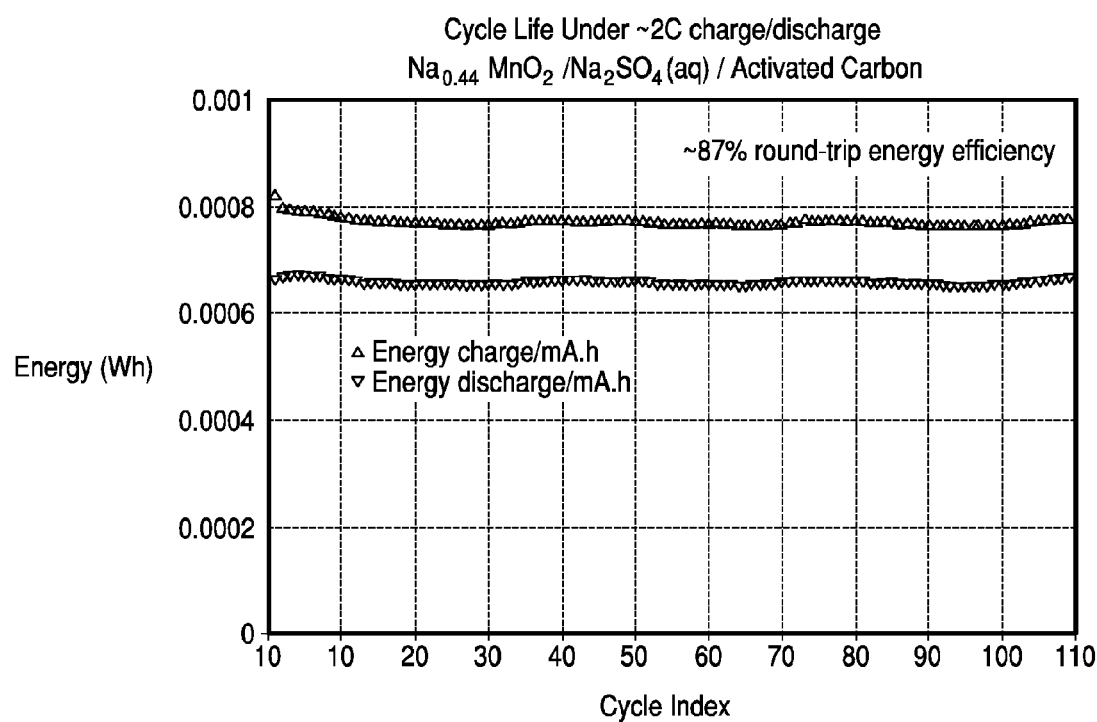

Performance of SolidState Na0.44 MnO2 with 1 M Na2SO4, NaBir Binder

Solid State $Na_{0.44}MnO_2$
NaBir Binder Used Instead of PTFE
1 M Na2SO4, Kuraray RP-20

1

SODIUM BASED AQUEOUS ELECTROLYTE ELECTROCHEMICAL SECONDARY ENERGY STORAGE DEVICE

CROSS REFERENCE TO RELATED APPLICATIONS

The present application is a divisional of U.S. application Ser. No. 12/385,277, filed Apr. 3, 2009, which claims priority to U.S. Provisional Patent Application Ser. No. 61/123,230, filed Apr. 7, 2008, 61/129,257, filed Jun. 13, 2008, and 61/154,156, filed Feb. 20, 2009, which are herein incorporated by reference in their entirety.

FIELD OF THE INVENTION

The present invention is generally directed to aqueous electrolyte electrochemical secondary energy storage devices and materials for use therein.

BACKGROUND OF THE INVENTION

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Batteries for these stationary applications typically store between 1 and 50 kWh of energy (depending on the application) and have historically been based on the lead-acid (Pb-acid) chemistry. Banks of deep-cycle lead-acid cells are assembled at points of distributed power generation and are known to last 1 to 10 years depending on the typical duty cycle. While these cells function well enough to support this application, there are a number of problems associated with their use, including: heavy use of environmentally unclean lead and acids (it is estimated that the Pb-acid technology is responsible for the release of over 100,000 tons of Pb into the environment each year in the US alone), significant degradation of performance if held at intermediate state of charge or routinely cycled to deep levels of discharge, a need for routine servicing to maintain performance, and the implementation of a requisite recycling program. There is a strong desire to replace the Pb-acid chemistry as used by the automotive industry. Unfortunately the economics of alternative battery chemistries has made this a very unappealing option to date.

Despite all of the recent advances in battery technologies, there are still no low-cost, clean alternates to the Pb-acid chemistry. This is due in large part to the fact that Pb-acid batteries are remarkably inexpensive compared to other chemistries (<$200/kWh), and there is currently a focus on developing higher-energy systems for transportation applications (which are inherently significantly more expensive than Pb-acid batteries).

SUMMARY OF THE INVENTION

Embodiments of the present invention provide a secondary hybrid aqueous energy storage device comprising an anode electrode, a cathode electrode which is capable of reversibly intercalating sodium cations, a separator, and a sodium cation containing aqueous electrolyte, wherein an initial active cathode electrode material comprises an alkali metal containing active cathode electrode material which deintercalates alkali metal ions during initial charging of the device.

Other embodiments provide a method of operating a hybrid aqueous energy storage device comprising an anode electrode, a cathode electrode, a separator, and a sodium containing aqueous electrolyte, the method comprising deintercalating alkali ions from an active cathode electrode material during initial charging of the device, reversibly intercalating sodium ions into the active cathode electrode material during discharge cycles, and deintercalating sodium ions from the active cathode electrode during subsequent charge cycles.

As used herein, the term electronegativity is used to describe the ability of an atom to attract electrons in a covalent bond to itself. Several different scales may be used to describe electronegativity. Unless otherwise indicated, electronegativity values indicated herein are according to the Pauling scale.

As used herein, the term faradaic reaction indicates a reaction that results in oxidation or reduction of an involved species. For example, in embodiments of the present invention, when Na cations intercalate in to active cathode materials, the active cathode materials must be reduced (that is electrons must be transferred to the active cathode materials) in order to preserve electroneutrality of the bulk material. Conversely, nonfaradaic processes involve the accumulation of charge at the surface of an electrode/solution interface resulting in the formation of an electrical double layer.

As used herein, the term secondary energy storage device may be used interchangeably with the term secondary battery.

BRIEF DESCRIPTION OF THE DRAWINGS

FIGS. 9A and 9B show single C/5 discharge behavior versus time and specific energy (Wh/kg), respectively, for Al-doped $\lambda$-$MnO_2$ active cathode material in aqueous $Na_2SO_4$ electrolyte from 1.7 to 0.8 V cell potential.

FIG. 10 shows data from a single C/10 discharge cycle as a function of time for Al-doped $\lambda$-$MnO_2$ active cathode material in aqueous $Na_2SO_4$ electrolyte from 1.7 to 0.6 V cell potential.

FIG. 29 shows a plot of charge and discharge energy as a function of cycle for a composite Na$_{0.44}$MnO$_2$/Na$_2$SO$_{4(aq)}$/composite activated carbon hybrid electrical energy storage device over 110 cycles.

DETAILED DESCRIPTION OF THE INVENTION

Hybrid electrochemical energy storage systems of embodiments of the present invention include a double-layer capacitor electrode coupled with an active electrode. In these systems, the capacitor electrode stores charge through a reversible nonfaradiac reaction of Na cations on the surface of the electrode (double-layer), while the active electrode undergoes a reversible faradic reaction in a transition metal oxide that intercalates and deintercalates Na cations similar to that of a battery.

An example of a Li-based system has been described by Wang, et al., which utilizes a spinel structure LiMn$_2$O$_4$ battery electrode, an activated carbon capacitor electrode, and an aqueous Li$_2$SO$_4$ electrolyte. Wang, et al., *Electrochemistry Communications*, 7:1138-42 (2005). In this system, the negative anode electrode stores charge through a reversible nonfaradiac reaction of Li-ion on the surface of an activated carbon electrode. The positive cathode electrode utilizes a reversible faradiac reaction of Li-ion intercalation/deintercalation in spinel LiMn$_2$O$_4$.

Figure 1:
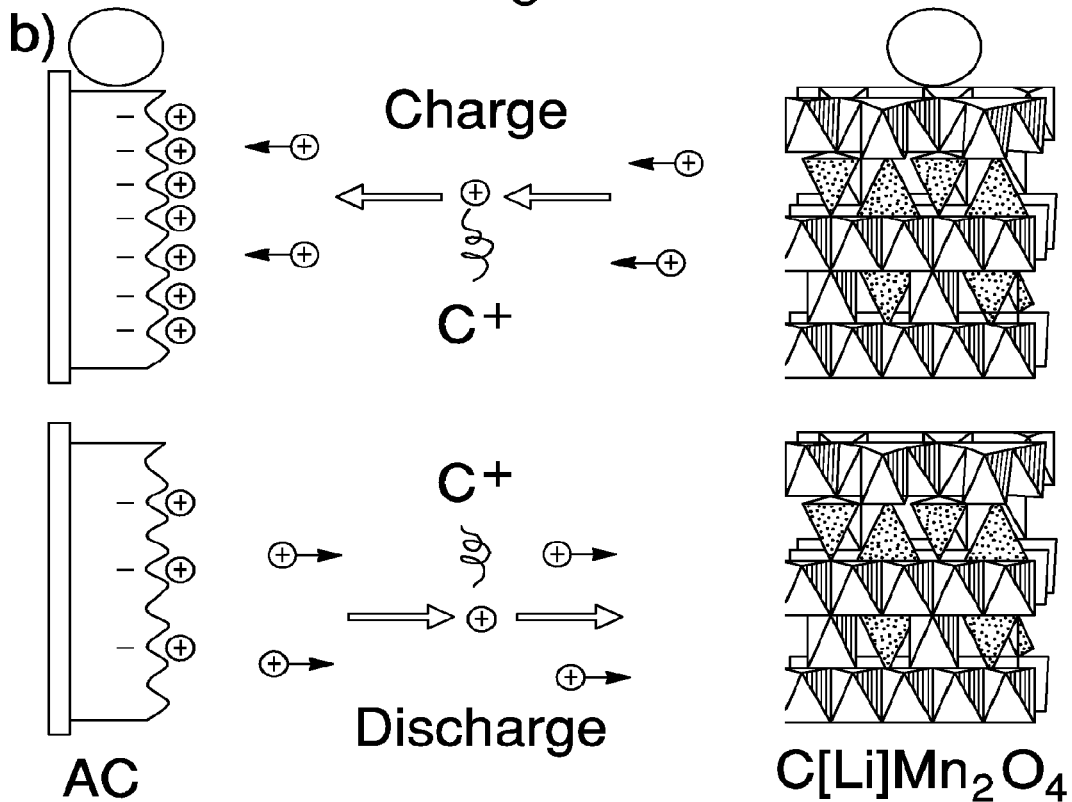
FIG. 1 shows an illustration of one possible charge/discharge mechanism employed by hybrid energy storage devices of the embodiments of the present invention.

In embodiments of the present invention, the charge/discharge processes of a device are associated with the transfer of Na cations between the active cathode electrode material and the anode electrode, with a Na cation containing electrolyte acting primarily as an ionic conductor between the two electrodes. That is, the cation concentration in the electrolyte stays relatively constant through a charge/discharge cycle. As the system is charged, cations in the electrolyte solution are adsorbed onto the surface of the anode material. At the same time, cations deintercalate from the active cathode material, thus keeping cation electrolyte concentration roughly constant through the charging process. Conversely, as the system is discharged, cations in the electrolyte solution intercalate into the active cathode material. At the same time, cations desorb from the surface of the anode material, thus keeping cation electrolyte concentration roughly constant through the discharge process. This process is shown schematically in FIG. 1.

The highly-purified solvent-based non-aqueous electrolytes that must be used in energy storage devices, such as batteries, supercapacitors, or hybrid-energy storage systems, is a source of expense. Highly purified solvent-based non-aqueous electrolytes are typically necessary in Li-based systems because Li-ion systems are designed to have a relatively high operating potential, typically between about 3.3 and 4.2 V. Such high operating potentials are problematic for aqueous systems because water is electrolyzed at ~1.3 V, so non-aqueous (i.e., solvent-based) electrolytes that are stable to >4 V are needed. This results in several undesirable consequences. First, the conductivity of these solvent-based electrolytes is much lower than water-based electrolytes, so Li-ion batteries are either significantly rate limited, or must be fabricated in such a way that they have very thin porous electrodes. Usually the latter design is selected despite being a much more complicated design with high surface area current collectors, very thin roll-coated electrodes, and a large-area polymer separator. Much of the cost associated with state of the art Li-ion batteries is a result of this design paradigm. Second, the cost of handling and fabrication is elevated since a moisture-free environment must be maintained during battery assembly. Third, a controlled moisture-free fabrication environment is required, which also increases cost and complexity.

In contrast, embodiments of the present invention provide a secondary (rechargeable) energy storage system which uses a water-based (aqueous) electrolyte, such as a Na-based aqueous electrolyte. This allows for use of much thicker electrodes, much less expensive separator and current collector materials, and benign and more environmentally friendly materials for electrodes and electrolyte salts. Additionally, energy storage systems of embodiments of the present invention can be assembled in an open-air environment, resulting in a significantly lower cost of production.

Figure 2:
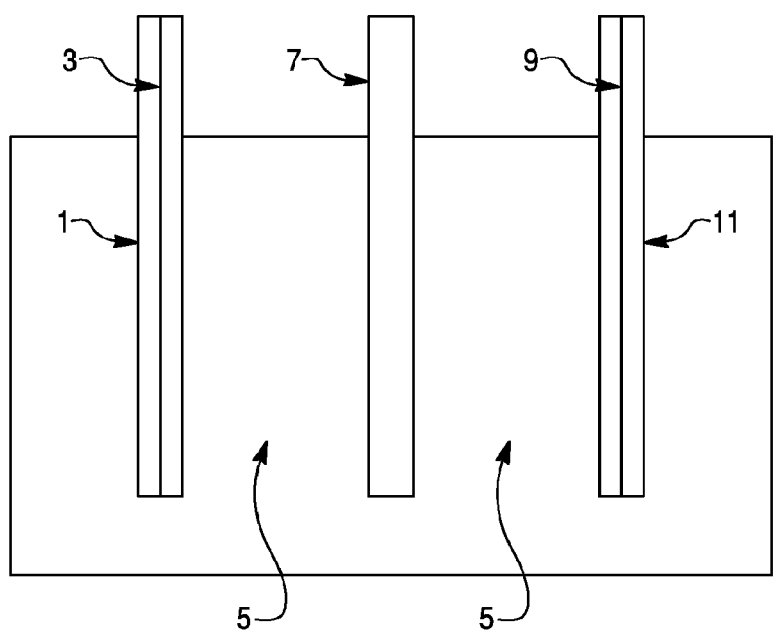
FIG. 2 shows a schematic representation of a secondary energy storage device according to an embodiment of the present invention.

Secondary (rechargeable) energy storage systems of embodiments of the present invention comprise an anode (i.e., negative) electrode, an anode side current collector, a cathode (i.e., positive) electrode, a cathode side current collector, a separator, and a Na-ion containing aqueous electrolyte. Any material capable of reversible intercalation/deintercalation of Na-ions may be used as an active cathode material. Any material capable of reversible adsorption/desorption of Na-ions and can function together with such an active cathode material and an appropriate electrolyte solution may be used as an anode material. As shown in the schematic of an exemplary device in FIG. 2, the cathode side current collector 1 is in contact with the cathode electrode 3. The cathode electrode 3 is in contact with the electrolyte solution 5, which is also in contact with the anode electrode 9. The separator 7 is located in the electrolyte solution 5 at a point between the cathode electrode 3 and the anode electrode 9. The anode electrode is also in contact with the anode side current collector 11. In FIG. 2, the components of the exemplary device are shown as not being in contact with each other. The device was illustrated this way to clearly indicate the presence of the electrolyte solution relative to both electrodes. However, in actual embodiments, the cathode electrode 3 is in contact with the separator 7, which is in contact with the anode electrode 9.

Device Components

Cathode

Several materials comprising a transition metal oxide, sulfide, phosphate, or fluoride can be used as active cathode materials capable of reversible Na-ion intercalation/deintercalation. Materials suitable for use as active cathode materials in embodiments of the present invention preferably contain alkali atoms, such as sodium, lithium, or both, prior to use as active cathode materials. It is not necessary for an active cathode material to contain Na and/or Li in the as-formed state (that is, prior to use in an energy storage device). However, Na cations from the electrolyte must be able to incorporate into the active cathode material by intercalation during operation of the energy storage device. Thus, materials that may be used as cathodes in the present invention comprise materials that do not necessarily contain Na in an as-formed state, but are capable of reversible intercalation/deintercalation of Na-ions during discharging/charging cycles of the energy storage device without a large overpotential loss.

In embodiments where the active cathode material contains akali-atoms (preferably Na or Li) prior to use, some or all of these atoms are deintercalated during the first cell charging cycle. Alkali cations from the electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions, such as hydrogen ions, in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention, where hydrogen ions or other anions are preferably not intercalated into the cathode active material.

Suitable active cathode materials may have the following general formula during use: $A_xM_yO_z$, where A is Na or a mixture of Na and one or more of Li, K, Be, Mg, and Ca, where x is within the range of 0 to 1, inclusive, before use and within the range of 0 to 10, inclusive, during use; M comprises any one or more transition metal, where y is within the range of 1 to 3, inclusive; preferably within the range of 1.5 and 2.5, inclusive; and O is oxygen, where z is within the range of 2 to 7, inclusive; preferably within the range of 3.5 to 4.5, inclusive.

In some active cathode materials with the general formula $A_xM_yO_z$, Na-ions reversibly intercalate/deintercalate during the discharge/charge cycle of the energy storage device. Thus, the quantity x in the active cathode material formula changes while the device is in use.

In some active cathode materials with the general formula $A_xM_yO_z$, A comprises at least 50 at % of at least one or more of Na, K, Be, Mg, or Ca, optionally in combination with Li; M comprises any one or more transition metal; O is oxygen; x ranges from 3.5 to 4.5 before use and from 1 to 10 during use; y ranges from 8.5 to 9.5 and z ranges from 17.5 to 18.5. In these embodiments, A preferably comprises at least 51 at % Na, such as at least 75 at % Na, and 0 to 49 at %, such as 0 to 25 at %, Li, K, Be, Mg, or Ca; M comprises one or more of Mn, Ti, Fe, Co, Ni, Cu, V, or Sc; x is about 4 before use and ranges from 0 to 10 during use; y is about 9; and z is about 18.

In some active cathode materials with the general formula $A_xM_yO_z$, A comprises Na or a mix of at least 80 atomic percent Na and one or more of Li, K, Be, Mg, and Ca. In these embodiments, x is preferably about 1 before use and ranges from 0 to about 1.5 during use. In some preferred active cathode materials, M comprises one or more of Mn, Ti, Fe, Co, Ni, Cu, and V, and may be doped (less than 20 at %, such as 0.1 to 10 at %; for example, 3 to 6 at %) with one or more of Al, Mg, Ga, In, Cu, Zn, and Ni.

General classes of suitable active cathode materials include (but are not limited to) the layered/orthorhombic $NaMO_2$ (birnessite), the cubic spinel based manganate (e.g., $MO_2$, such as λ-$MnO_2$ based material where M is Mn, e.g., $Li_xM_2O_4$ (where 1≤x<1.1) before use and $Na_yMn_2O_4$ in use), the $Na_2M_3O_7$ system, the $NaMPO_4$ system, the $NaM_2(PO_4)_3$ system, the $Na_2MPO_4F$ system, and the tunnel-structured $Na_{0.44}MO_2$, where M in all formula comprises at least one transition metal. Typical transition metals may be Mn or Fe (for cost and environmental reasons), although Co, Ni, Cr, V, Ti, Cu, Zr, Nb, W, Mo (among others), or combinations thereof, may be used to wholly or partially replace Mn, Fe, or a combination thereof. In embodiments of the present invention, Mn is a preferred transition metal. In some embodiments, cathode electrodes may comprise multiple active cathode materials, either in a homogenous or near homogenous mixture or layered within the cathode electrode.

In some embodiments, the initial active cathode material comprises $NaMnO_2$ (birnassite structure) optionally doped with one or more metals, such as Li or Al.

In some embodiments, the initial active cathode material comprises $\lambda$-$MnO_2$ (i.e., the cubic isomorph of manganese oxide) based material, optionally doped with one or more metals, such as Li or Al.

In these embodiments, cubic spinel $\lambda$-$MnO_2$ may be formed by first forming a lithium containing manganese oxide, such as lithium manganate (e.g., cubic spinel $LiMn_2O_4$ or non-stoichiometric variants thereof). In embodiments which utilize a cubic spinel $\lambda$-$MnO_2$ active cathode material, most or all of the Li may be extracted electrochemically or chemically from the cubic spinel $LiMn_2O_4$ to form cubic spinel $\lambda$-$MnO_2$ type material (i.e., material which has a 1:2 Mn to O ratio, and/or in which the Mn may be substituted by another metal, and/or which also contains an alkali metal, and/or in which the Mn to O ratio is not exactly 1:2). This extraction may take place as part of the initial device charging cycle. In such instances, Li-ions are deintercalated from the as-formed cubic spinel $LiMn_2O_4$ during the first charging cycle. Upon discharge, Na-ions from the electrolyte intercalate into the cubic spinel $\lambda$-$MnO_2$. As such, the formula for the active cathode material during operation is $Na_yLi_xMn_2O_4$ (optionally doped with one or more additional metal as described above, preferably Al), with $0<x<1$, $0<y<1$, and $x+y \leq 1.1$. Preferably, the quantity $x+y$ changes through the charge/discharge cycle from about 0 (fully charged) to about 1 (fully discharged). However, values above 1 during full discharge may be used. Furthermore, any other suitable formation method may be used. Non-stoichiometric $Li_xMn_2O_4$ materials with more than 1 Li for every 2 Mn and 4 O atoms may be used as initial materials from which cubic spinel $\lambda$-$MnO_2$ may be formed (where $1 \leq x < 1.1$ for example). Thus, the cubic spinel $\lambda$-manganate may have a formula $Al_zLi_xMn_{2-z}O_4$ where $1 \leq x < 1.1$ and $0 \leq z < 0.1$ before use, and $Al_zLi_xNa_yMn_{2-z}O_4$ where $0.1 \leq x < 1.1$, $0 \leq y < 1$, $0 \leq x+y < 1.1$, and $0 \leq z < 0.1$ in use (and where Al may be substituted by another dopant).

In some embodiments, the initial cathode material comprises $Na_2Mn_3O_7$, optionally doped with one or more metals, such as Li or Al.

In some embodiments, the initial cathode material comprises $Na_2FePO_4F$, optionally doped with one or more metals, such as Li or Al.

In some embodiments, the cathode material comprises $Na_{0.44}MnO_2$, optionally doped with one or more metals, such as Li or Al. This active cathode material may be made by thoroughly mixing $Na_2CO_3$ and $Mn_2O_3$ to proper molar ratios and firing, for example at about 800° C. The degree of Na content incorporated into this material during firing determines the oxidation state of the Mn and how it bonds with $O_2$ locally. This material has been demonstrated to cycle between $0.33<x<0.66$ for $Na_xMnO_2$ in a non-aqueous electrolyte.

Optionally, the cathode electrode may be in the form of a composite cathode comprising one or more active cathode materials, a high surface area conductive diluent (such as conducting grade graphite, carbon blacks, such as acetylene black, non-reactive metals, and/or conductive polymers), a binder, a plasticizer, and/or a filler. Exemplary binders may comprise polytetrafluoroethylene (PTFE), a polyvinylchloride (PVC)-based composite (including a PVC-$SiO_2$ composite), cellulose-based materials, polyvinylidene fluoride (PVDF), hydrated birnassite (when the active cathode material comprises another material), other non-reactive non-corroding polymer materials, or a combination thereof. A composite cathode may be formed by mixing a portion of one or more preferred active cathode materials with a conductive diluent, and/or a polymeric binder, and pressing the mixture into a pellet. In some embodiments, a composite cathode electrode may be formed from a mixture of about 50 to 90 wt % active cathode material, with the remainder of the mixture comprising a combination of one or more of diluent, binder, plasticizer, and/or filler. For example, in some embodiments, a composite cathode electrode may be formed from about 80 wt % active cathode material, about 10 to 15 wt % diluent, such as carbon black, and about 5 to 10 wt % binder, such as PTFE.

One or more additional functional materials may optionally be added to a composite cathode to increase capacity and replace the polymeric binder. These optional materials include but are not limited to Zn, Pb, hydrated $NaMnO_2$ (birnassite), and hydrated $Na_{0.44}MnO_2$ (orthorhombic tunnel structure). In instances where hydrated $NaMnO_2$ (birnassite) and/or hydrated $Na_{0.44}MnO_2$ (orthorhombic tunnel structure) is added to a composite cathode, the resulting device has a dual functional material composite cathode.

A cathode electrode will generally have a thickness in the range of about 40 to 800 µm.

Anode:

The anode may comprise any material capable of reversibly storing Na-ions through surface adsorption/desorption (via an electrochemical double layer reaction and/or a pseudocapacitive reaction (i.e., a i.e. partial charge transfer surface interaction)) and have sufficient capacity in the desired voltage range. Exemplary materials meeting these requirements include porous activated carbon, graphite, mesoporous carbon, carbon nanotubes, disordered carbon, Ti-oxide (such as titania) materials, V-oxide materials, phospho-olivine materials, other suitable mesoporous ceramic materials, and a combinations thereof. In preferred embodiments, activated carbon is used as the anode material.

Optionally, the anode electrode may be in the form of a composite anode comprising one or more anode materials, a high surface area conductive diluent (such as conducting grade graphite, carbon blacks, such as acetylene black, non-reactive metals, and/or conductive polymers), a binder, such as PTFE, a PVC-based composite (including a PVC-$SiO_2$ composite), cellulose-based materials, PVDF, other non-reactive non-corroding polymer materials, or a combination thereof, plasticizer, and/or a filler. A composite anode may be formed my mixing a portion of one or more preferred anode materials with a conductive diluent, and/or a polymeric binder, and pressing the mixture into a pellet. In some embodiments, a composite anode electrode may be formed from a mixture from about 50 to 90 wt % anode material, with the remainder of the mixture comprising a combination of one or more of diluent, binder, plasticizer, and/or filler. For example, in some embodiments, a composite cathode electrode may be formed from about 80 wt % activated carbon, about 10 to 15 wt % diluent, such as carbon black, and about 5 to 10 wt % binder, such as PTFE.

One or more additional functional materials may optionally be added to a composite anode to increase capacity and replace the polymeric binder. These optional materials include but are not limited to Zn, Pb, hydrated $NaMnO_2$ (birnassite), and hydrated $Na_{0.44}MnO_2$ (orthorhombic tunnel structure).

An anode electrode will generally have a thickness in the range of about 80 to 1600 µm.

Current Collectors:

In embodiments of the present invention, the cathode and anode materials may be mounted on current collectors. For optimal performance, current collectors are desirable that are electronically conductive and corrosion resistant in the electrolyte (aqueous Na-cation containing solutions, described below) at operational potentials.

For example, an anode current collector must be stable in a range of approximately −1.2 to −0.5 V vs. a standard $Hg/Hg_2SO_4$ reference electrode, since this is the nominal potential range that the anode half of the electrochemical cell is exposed during use. A cathode current collector must be stable in a range of approximately 0.1 to 0.7 V vs. a standard $Hg/Hg_2SO_4$ reference electrode.

Suitable uncoated current collector materials for the anode side include stainless steel, Ni, Ni—Cr alloys, Al, Ti, Cu, Pb and Pb alloys, refractory metals, and noble metals.

Suitable uncoated current collector materials for the cathode side include stainless steel, Ni, Ni—Cr alloys, Ti, Pb-oxides ($PbO_x$), and noble metals.

Current collectors may comprise solid foils or mesh materials.

Another approach is to coat a metal foil current collector of a suitable metal, such as Al, with a thin passivation layer that will not corrode and will protect the foil onto which it is deposited. Such corrosion resistant layers may be, but are not limited to, TiN, CrN, C, CN, NiZr, NiCr, Mo, Ti, Ta, Pt, Pd, Zr, W, FeN, CoN, etc. These coated current collectors may be used for the anode and/or cathode sides of a cell. In one embodiment, the cathode current collector comprises Al foil coated with TiN, FeN, C, or CN. The coating may be accomplished by any method known in the art, such as but not limited to physical vapor deposition such as sputtering, chemical vapor deposition, electrodeposition, spray deposition, or lamination.

Electrolyte:

Electrolytes useful in embodiments of the present invention comprise a salt dissolved fully in water. For example, the electrolyte may comprise a 0.1 M to 10 M solution of at least one anion selected from the group consisting of $SO_4^{2-}$, $NO_3^-$, $ClO_4^-$, $PO_4^{3-}$, $CO_3^{2-}$, $Cl^-$, and/or $OH^-$. Thus, Na cation containing salts may include (but are not limited to) $Na_2SO_4$, $NaNO_3$, $NaClO_4$, $Na_3PO_4$, $Na_2CO_3$, NaCl, and NaOH, or a combination thereof.

In some embodiments, the electrolyte solution may be substantially free of Na. In these instances, cations in salts of the above listed anions may be an alkali other than Na (such as K) or alkaline earth (such as Ca, or Mg) cation. Thus, alkali other than Na cation containing salts may include (but are not limited to) $K_2SO_4$, $KNO_3$, $KClO_4$, $K_3PO_4$, $K_2CO_3$, KCl, and KOH. Exemplary alkaline earth cation containing salts may include $CaSO_4$, $Ca(NO_3)_2$, $Ca(ClO_4)_2$, $CaCO_3$, and $Ca(OH)_2$, $MgSO_4$, $Mg(NO_3)_2$, $Mg(ClO_4)_2$, $MgCO_3$, and $Mg(OH)_2$. Electrolyte solutions substantially free of Na may be made from any combination of such salts. In other embodiments, the electrolyte solution may comprise a solution of a Na cation containing salt and one or more non-Na cation containing salt.

Molar concentrations preferably range from about 0.05 M to 3 M, such as about 0.1 to 1 M, at 100° C. for $Na_2SO_4$ in water depending on the desired performance characteristics of the energy storage device, and the degradation/performance limiting mechanisms associated with higher salt concentrations. Similar ranges are preferred for other salts.

A blend of different salts (such as a blend of a sodium containing salt with one or more of an alkali, alkaline earth, lanthanide, aluminum and zinc salt) may result in an optimized system. Such a blend may provide an electrolyte with sodium cations and one or more cations selected from the group consisting of alkali (such as K), alkaline earth (such as Mg and Ca), lanthanide, aluminum, and zinc cations.

Optionally, the pH of the electrolyte may be altered by adding some additional $OH^-$ ionic species to make the electrolyte solution more basic, for example by adding NaOH other OH-containing salts, or by adding some other $OH^-$ concentration-affecting compound (such as $H_2SO_4$ to make the electrolyte solution more acidic). The pH of the electrolyte affects the range of voltage stability window (relative to a reference electrode) of the cell and also can have an effect on the stability and degradation of the active cathode material and may inhibit proton ($H^+$) intercalation, which may play a role in active cathode material capacity loss and cell degradation. In some cases, the pH can be increased to 11 to 13, thereby allowing different active cathode materials to be stable (than were stable at neutral pH 7). In some embodiments, the pH may be within the range of about 3 to 13, such as between about 3 and 6 or between about 8 and 13.

Optionally, the electrolyte solution contains an additive for mitigating degradation of the active cathode material, such as birnassite material. An exemplary additive may be, but is not limited to, $Na_2HPO_4$, in quantities sufficient to establish a concentration ranging from 0.1 mM to 100 mM.

Separator:

A separator for use in embodiments of the present invention may comprise a cotton sheet, PVC (polyvinyl chloride), PE (polyethylene), glass fiber or any other suitable material.

Operational Characteristics

As described above, in embodiments where the active cathode material contains akali-atoms (preferably Na or Li) prior to use, some or all of these atoms are deintercalated during the first cell charging cycle. Alkali cations from the electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention.

In some embodiments, a hybrid energy storage device according to an embodiment of the present invention may be capable of operating over 500 cycles, such as over 5000 cycles, such as between 5000 and 10000 cycles at full discharge with less than 20% loss of initial capacity; preferably less than or equal to 10% loss of initial capacity; preferably less than or equal to about 5% loss of initial capacity, such as between 0 and 10% loss of initial capacity; such as between 1 and 5%.

In some embodiments, a hybrid energy storage device according to an embodiment of the present invention comprises an activated carbon anode material exhibiting greater than or equal to about 60 mAh/g specific capacity (cathode basis), such as 60 to 130 mAh/g (cathode basis), with $Na_2SO_4$ electrolyte.

In some embodiments, a hybrid energy storage device according to an embodiment of the present invention comprises a $Na_{0.44}MnO_2$-type active cathode material exhibiting greater than or equal to about 20 mAh/g specific capacity with $Na_2SO_4$ electrolyte, such as about 45 to 80 mAh/g (cathode basis).

In some embodiments, a hybrid energy storage device according to an embodiment of the present invention comprises a $Na_{0.44}MO_2$-type active cathode material, an activated carbon anode material, and exhibits a specific energy (normalized to active cathode and anode material mass) of greater than 20 Wh/kg, such as between 20 and 35 Wh/kg, when cycled between potentials of 0.35 and 1.5 V in 1 M $Na_2SO_4$ at C/5 rate or slower.

In some embodiments, a hybrid energy storage device according to an embodiment of the present invention comprises a cubic spinel $\lambda$-$MO_2$—$NaM_2O_4$-type active cathode material exhibiting greater than or equal to about 75 mAh/g specific capacity (cathode basis) with $Na_2SO_4$ electrolyte.

In some embodiments, a hybrid energy storage device according to an embodiment of the present invention comprises a cubic spinel $\lambda$-$MO_2$—$NaM_2O_4$-type active cathode material, an activated carbon anode material, and exhibits a specific energy (normalized to active cathode and anode material mass) of greater than 20 Wh/kg, such as between about 20 and 105 Wh/kg (when cycled between potentials of 0.60 and 1.55 V in 1 M $Na_2SO_4$ at C/10 rate or slower); preferably as greater than 40 Wh/kg, such as between 40 and 105 Wh/kg (when cycled between potentials of 0.60 and 1.9 V in 1 M $Na_2SO_4$ at C/10 rate or slower).

In some embodiments, a hybrid energy storage device according to an embodiment of the present invention comprises a cubic spinel $\lambda$-$MO_2$—$NaM_2O_4$-type active cathode material, an activated carbon anode material, and exhibits a specific energy (normalized to active cathode and anode material mass) of between 10 and 105 Wh/kg (cathode basis), for a specific power of between 20 to 1100 W/kg, such as between about 70 and about 105 Wh/kg for between 20 and 100 W/kg, at 23° C. at 0.1C rate.

In some embodiments, a hybrid energy storage device according to an embodiment of the present invention comprises a cubic spinel $\lambda$-$MO_2$—$NaM_2O_4$-type active cathode material, an activated carbon anode material, and exhibits a specific energy (normalized to active cathode and anode material mass) of between 30 and 50 Wh/kg, at −5 to 23° C. at 1 C rate. In some embodiments, the specific energy is between 65 and 100 Wh/kg, at −5 to 23° C. at 0.5 C rate.

In some embodiments, a hybrid energy storage device according to an embodiment of the present invention comprises a cathode electrode that is able to support greater than 1 kW of discharge power per kg of active cathode material. In these embodiments, the active cathode material may comprise $Na_{0.44}MnO_2$ or $\lambda$-$NaMnO_2$ (cubic spinel $NaMn_2O_4$)

The following examples serve to illustrate the invention. These Examples are in no way intended to limit the scope of the claimed methods and devices.

EXAMPLES

Example 1

A test cell was constructed with a $\lambda$-$MO_2$-type active cathode material versus an activated carbon anode material in 1 M $Na_2SO_4$ in DI $H_2O$ electrolyte.

Figure 3:
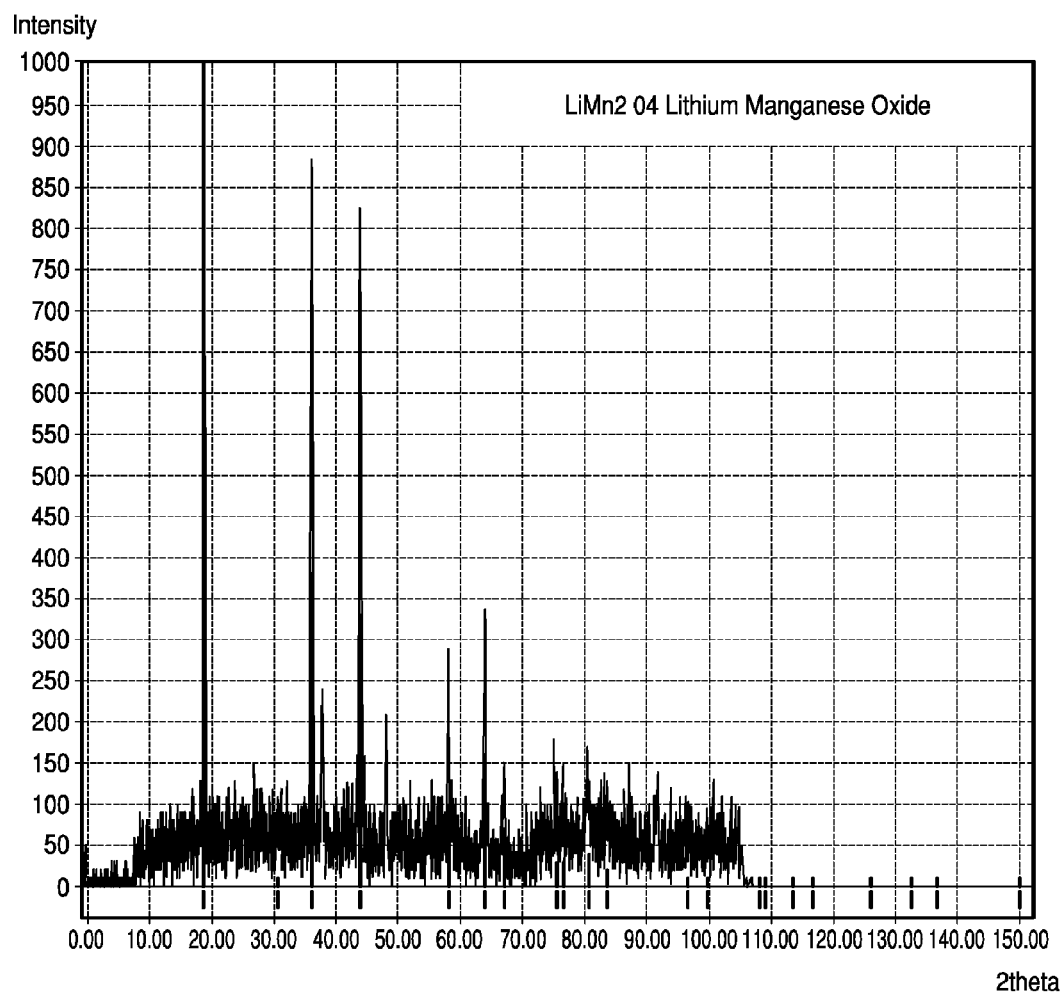
FIG. 3 shows the X-ray diffraction pattern obtained from spinel structure $Li_{1.05}Mn_{1.89}Al_{0.06}O_4$ synthesized according the method described in Example 1.

The active cathode material was made from Al-doped, Li-containing, cubic spinel $MnO_2$. Specifically, the Li-containing cubic spinel was synthesized by thoroughly mixing $Li_2CO_3$, $Mn_2O_3$, and $Al(OH)_3$ to proper mole ratios and firing at 750° C. for 24 hours. This material resulted in a spinel structure with the formula $Li_{1.05}Mn_{1.89}Al_{0.06}O_4$, as verified by X-ray diffraction analysis. X-ray spectra is shown in FIG. 3. As the X-ray data confirm, this material fits the well known cubic spinel $LiMn_2O_4$ structure, as archived by JCPDS card #00-035-0782.

A composite cathode was formed by mixing about 80 wt % $Li_{1.05}Mn_{1.89}Al_{0.06}O_4$ initial active material, 10 wt % carbon black conductive diluent, and about 10% PTFE polymeric binder. This mixture was then pressed into a pellet, which was placed into a large electrochemical cell and biased to remove most of the Li. The cell was held at greater than 4.1 V for at least 5 hours to electrochemically extract the Li, although chemical extraction could have been used instead.

Once the electrochemical extraction was completed, X-ray diffraction analysis was again performed on the pellet, and a new Al-doped $\lambda$-$MnO_2$ phase was indicated that was substantially free of Li (i.e., 0 to 5 at % Li may have remained). The diffraction pattern from the new phase is shown in FIG. 3.

Figure 4:
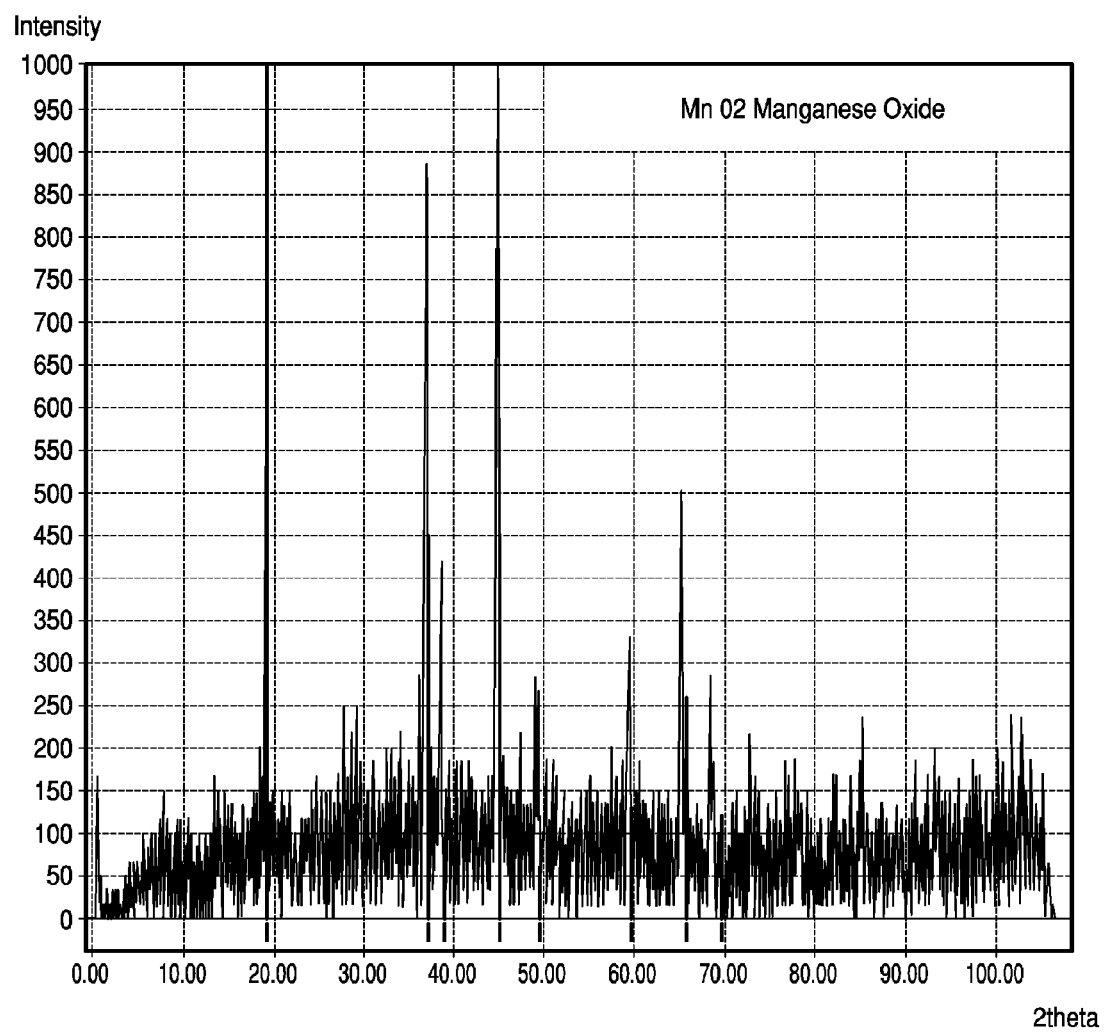
FIG. 4 shows the X-ray diffraction pattern obtained from spinel structure $Mn_{1.89}Al_{0.06}O_4$ (Al-doped $\lambda$-$MnO_2$) after deintercalation of Li from spinel $Li_{1.05}Mn_{1.89}Al_{0.06}O_4$ as described in Example 1.
Figure 5A:
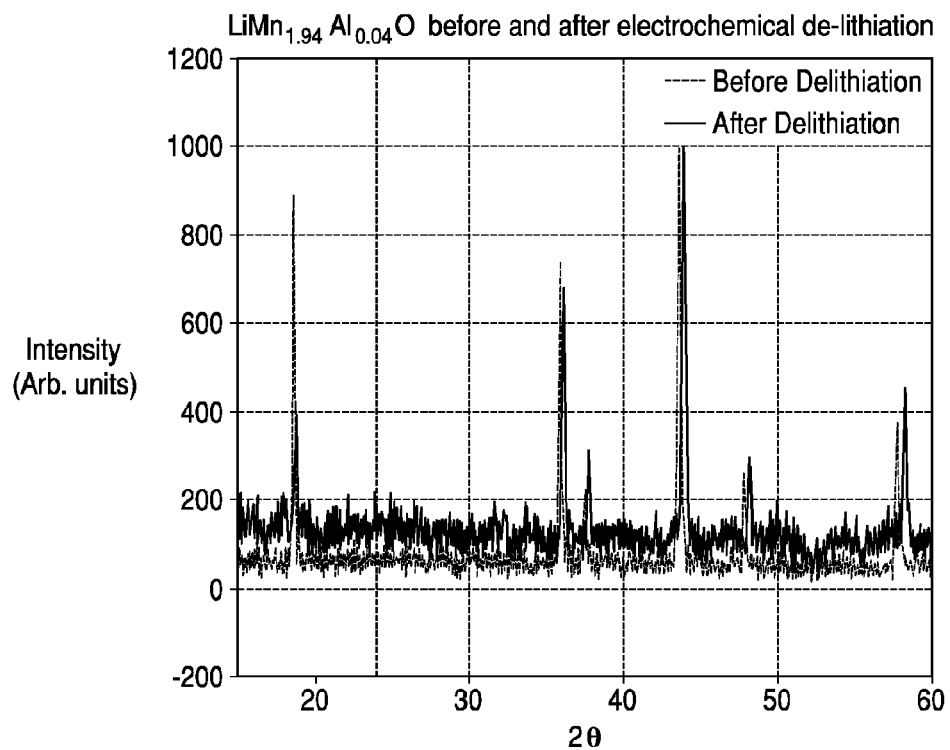
FIGS. 5A and 5B show the overlap of a portion of the X-ray diffraction patterns from FIGS. 3 and 4.
Figure 5B:
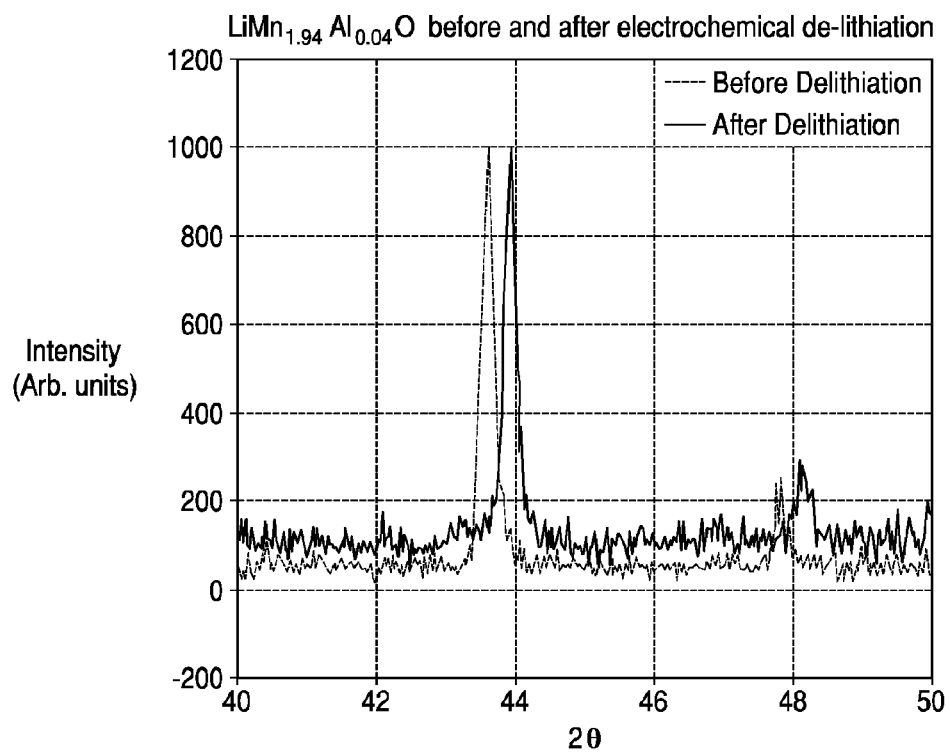

The data in FIG. 4 show that the material is a close match to $\lambda$-$MnO_2$ as described by JCPDS card #00-044-0992. The diffraction patterns shown in FIGS. 3 and 4 are superimposed in FIG. 5 to demonstrate the difference.

Figure 6:
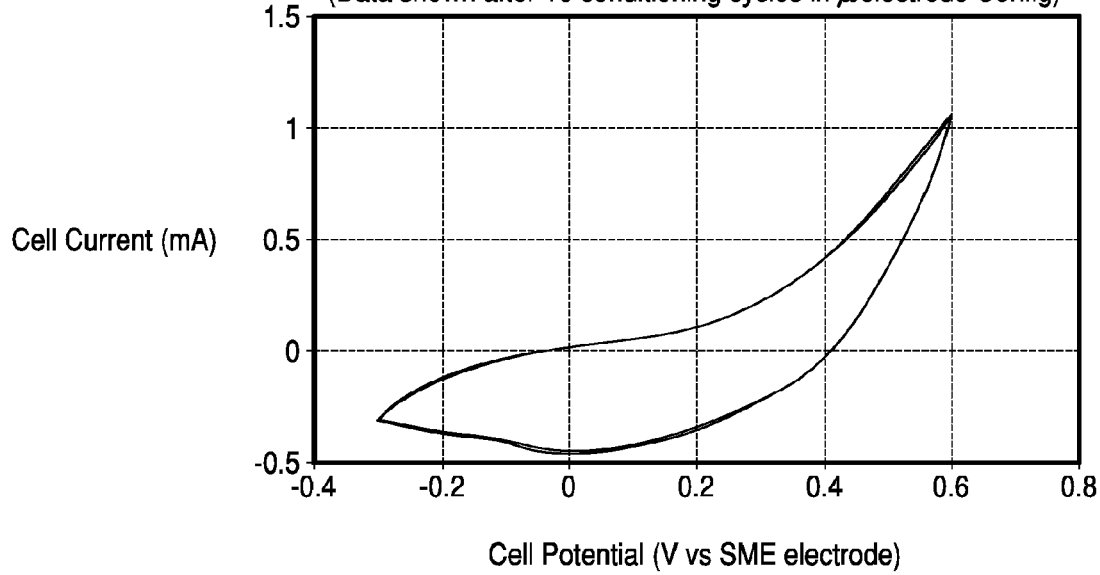
FIG. 6 shows data from three sequential cyclic voltammargrams for de-lithiated Al-doped $\lambda$-$MnO_2$ active cathode material in aqueous $Na_2SO_4$ electrolyte obtained after ten conditioning cycles.

The resulting Al-doped $\lambda$-$MnO_2$ material was then placed as a working electrode (cathode) into an electrochemical half cell environment with a Pt counter electrode, and a mercury/mercury sulfate reference electrode, and a $Na_2SO_4$ aqueous electrolyte. The half-cell was cycled between −0.3 and 0.6 V vs. SME. The data indicate that the cathode does display Na-ion intercalation/deintercalation events and is stable over many cycles. The data shown in FIG. 6 show three sequential cyclic voltammargrams obtained after ten conditioning cycles. This result indicates that Al-doped $\lambda$-$MnO_2$ is able to reversibly intercalate Na cations from a Na cation containing electrolyte with virtually no Li or Li cations present.

To make a functional cell, a pellet was pressed of the composite Li-containing active cathode material described above and placed in a coin cell. The anode, separator, and electrolyte in the coin cell are described below.

Activated carbon was used as the anode material. This material is known to reversibly store Li cations through surface adsorption/desorption and also has sufficient capacity in the desired voltage range. It was anticipated that this material could store between 40 and 100 mAh/g of $Na^+$ in the voltage range of 1.5 to 2 V vs. Na metal.

A composite anode was formed by mixing about 80 wt % activated carbon, 10 wt % carbon black conductive diluent, and 10 wt % PTFE polymeric binder and pressing the mixture into a pellet. The density of the pellet was at least 0.35 g/cm$^3$. The mass of the pressed anode pellet was matched to the mass of the cathode pellet so that both electrodes could hold sufficient Na cations to make maximum use of the active material present.

Figure 7:
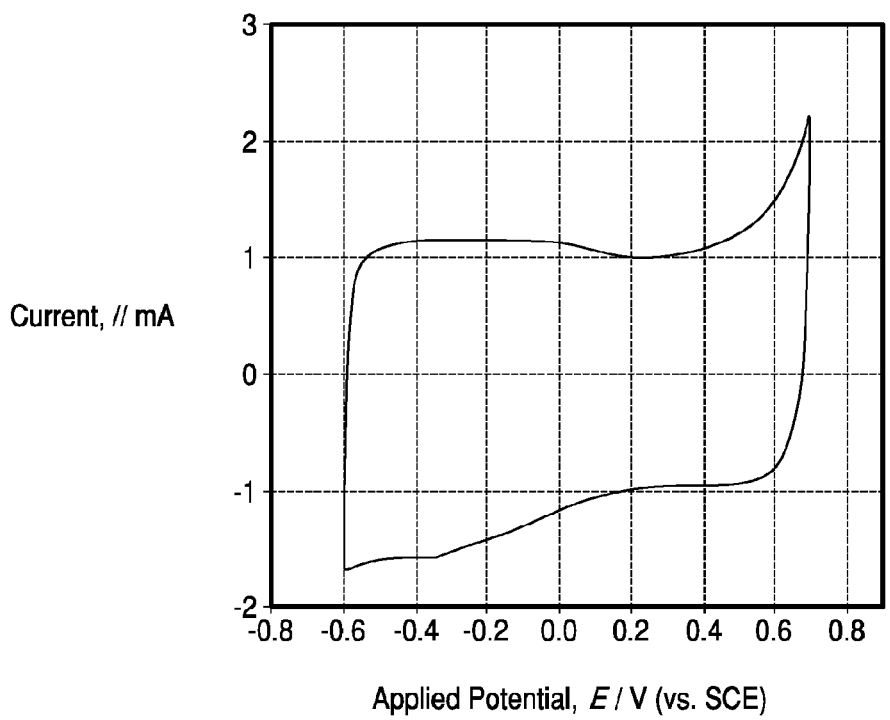
FIG. 7 shows cyclic voltammargram data for activated carbon anode material in aqueous $Na_2SO_4$ electrolyte. No distinct reduction-oxidation peaks are observed.

This composite anode material was placed as a working electrode into an electrochemical half cell environment with a Pt counter electrode, and a mercury/mercury sulfate reference electrode. The half-cell was cycled between −0.6 and 0.7 V vs. SME, with a 1 M $Na_2SO_4$ electrolyte solution. The data indicate that the anode material does not display Na-ion intercalation/deintercalation events, exhibited symmetrical behavior indicative of a reversible Na cation storage process via a surface adsorption/electrochemical double layer capacitance effect. A cyclic voltammargram obtained from this half cell is shown in FIG. 7.

Figure 8:
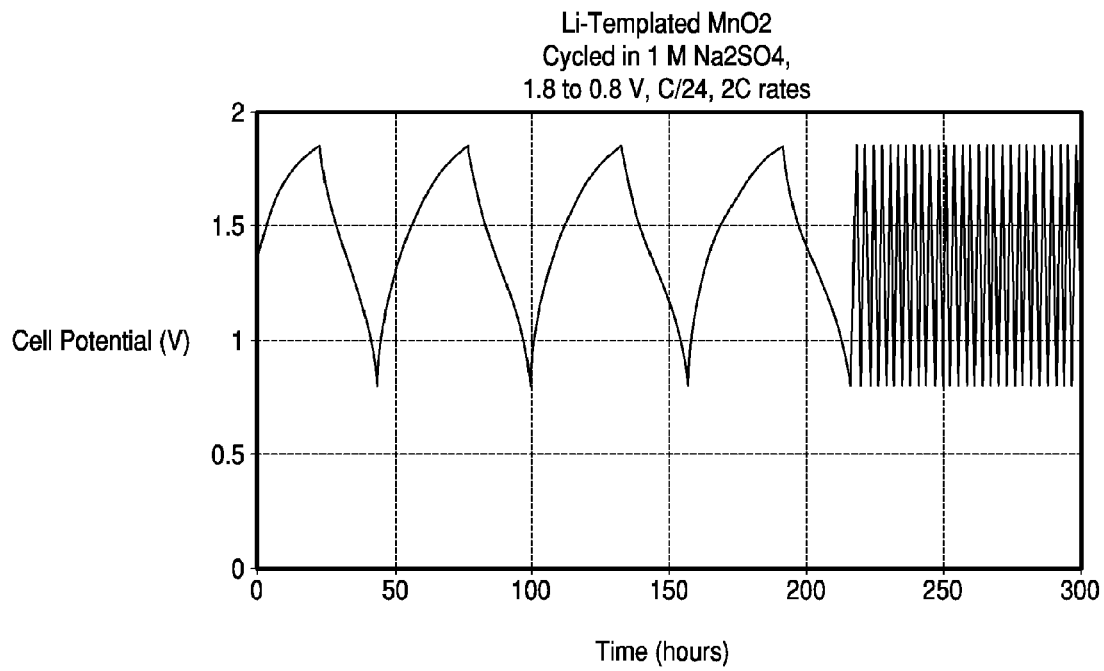
FIG. 8 shows the charge/discharge behavior (i.e., cell potential versus time through charge/discharge cycles) of a full aqueous Na-ion hybrid energy storage device based on a de-lithiated Al-doped $\lambda$-$MnO_2$ active cathode material in aqueous $Na_2SO_4$ electrolyte at C/24 and 2C rates.

The anode and cathode material pellets were fitted into standard stainless steel 2032 coin cell test fixtures. Cotton sheeting was used as a separator material, and Ni mesh served a current collectors for both electrodes. After some irreversible capacity loss on the first several formation cycles, typical charge/discharge behavior was observed to be very consistent and stable in the voltage range between 0.8 and 1.8 V, at least, as shown in FIG. 8. The cell delivered uniform charge/discharge behavior during both C/24 and 2 C cycling and little obvious decay was observed.

Figure 9A:
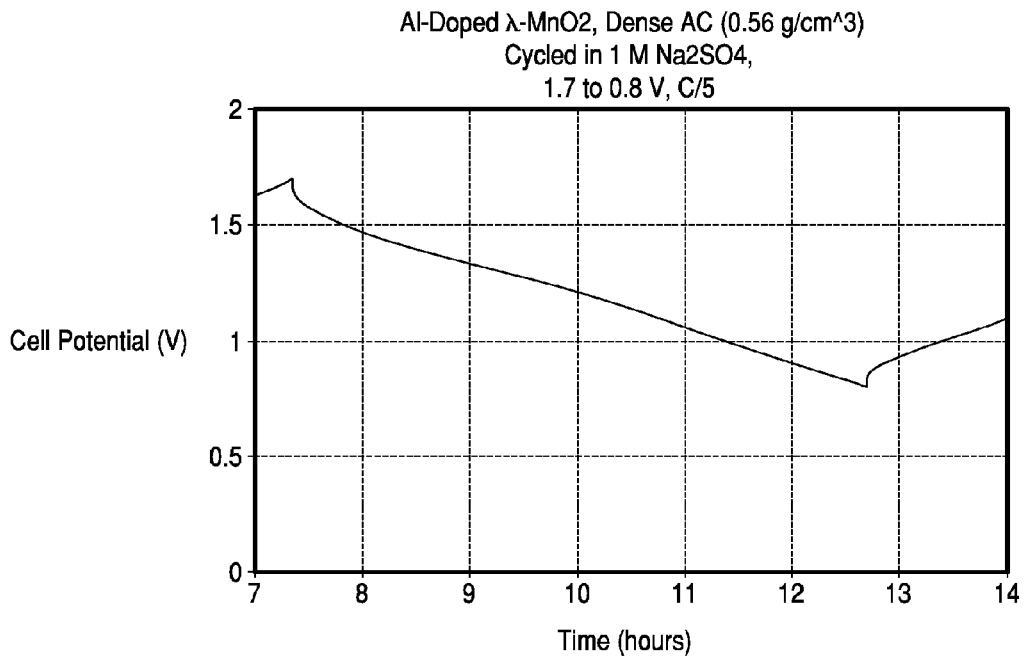

Data showing a single C/5 discharge curve as a function of time and as a function of specific energy are shown in FIGS. 9A and 9B, respectively. Data showing a single C/10 discharge curve as a function of specific energy is shown in FIG. 10.

Figure 12A:
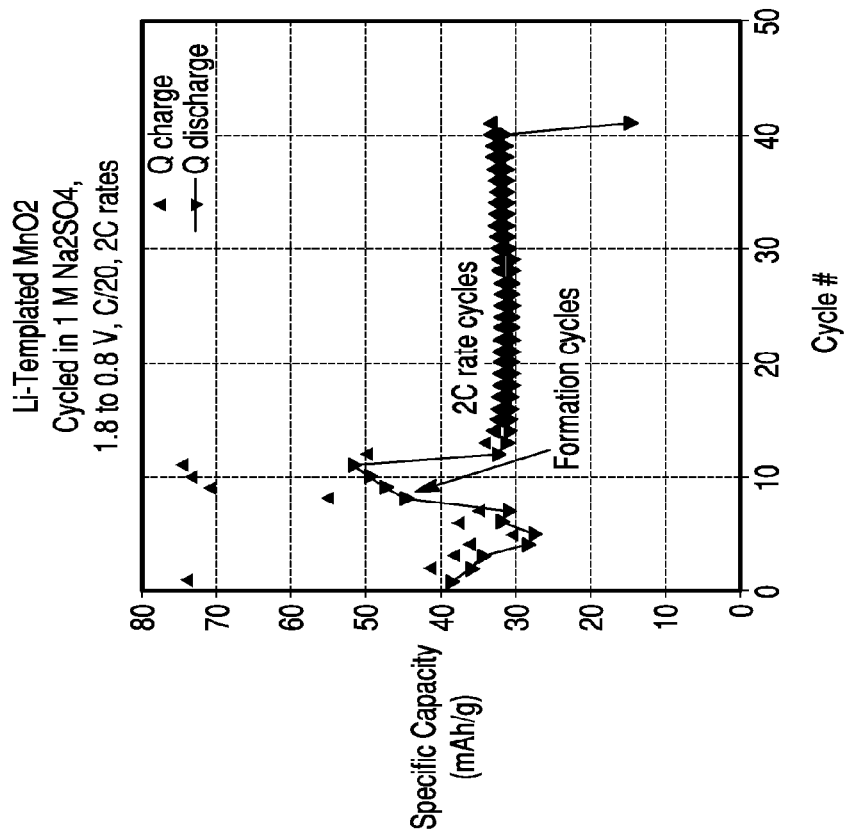
FIGS. 12A and 12B show specific energy and specific capacity, respectively, versus cycle number for long term testing (up to 40 cycles) of a full aqueous Na-ion hybrid energy storage device based on a de-lithiated Al-doped λ-MnO$_2$ active cathode material in aqueous Na$_2$SO$_4$ electrolyte.
Figure 12B:
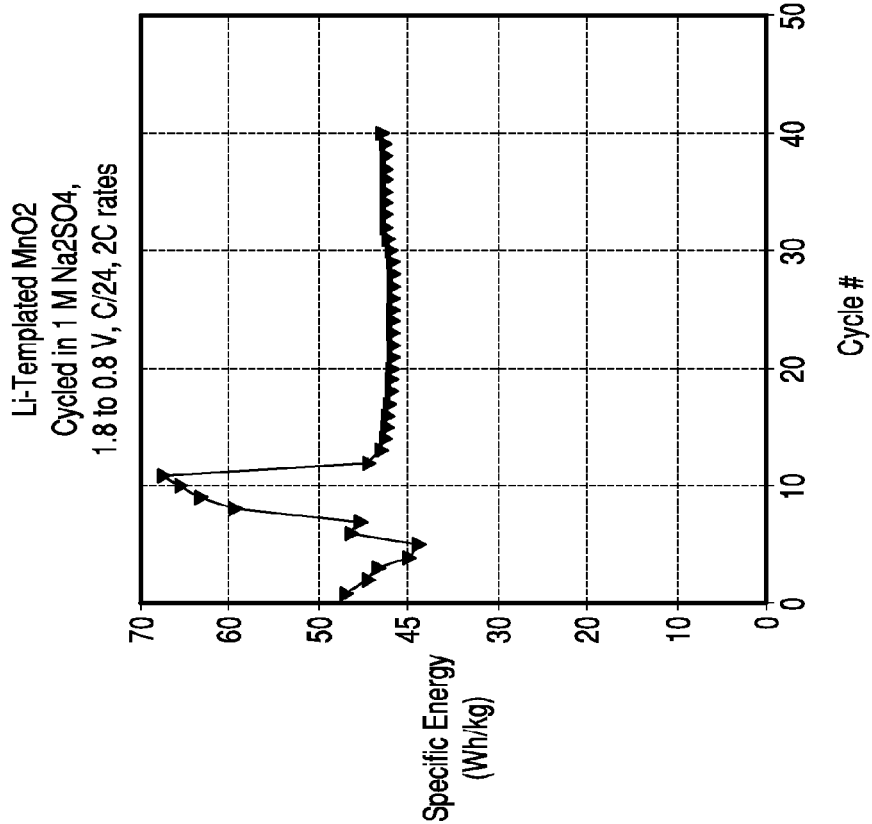
Figure 12C:
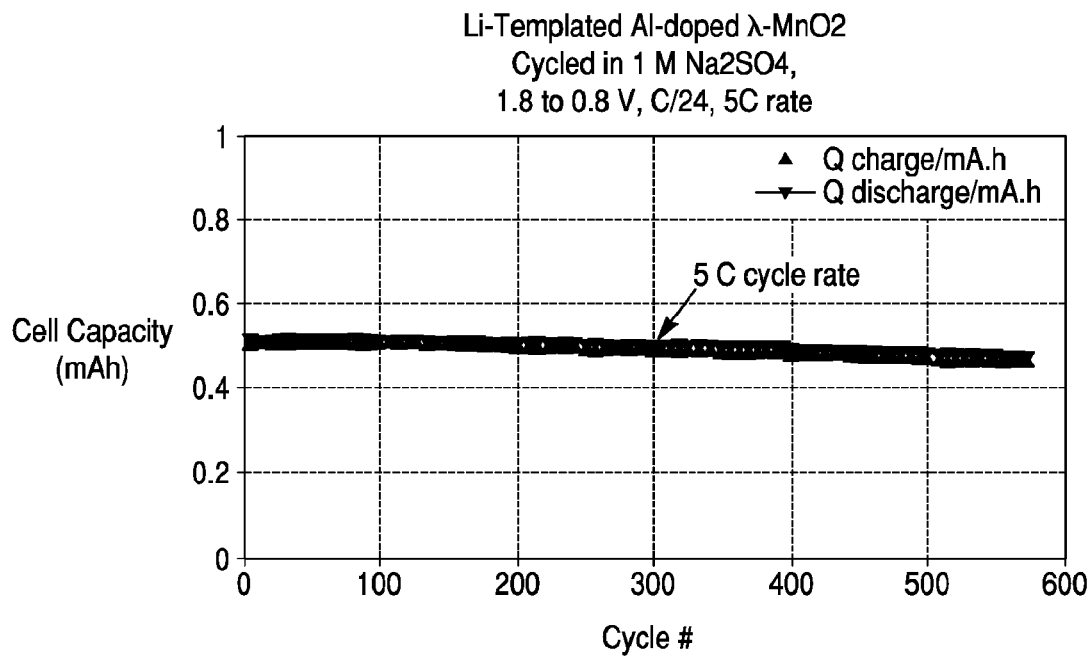
FIG. 12C shows extended high rate cycling performance (cell capacity versus cycle number) for more than 540 cycles at 5C rate across a potential range of 1.8 to 0.8 V.
Figure 17:
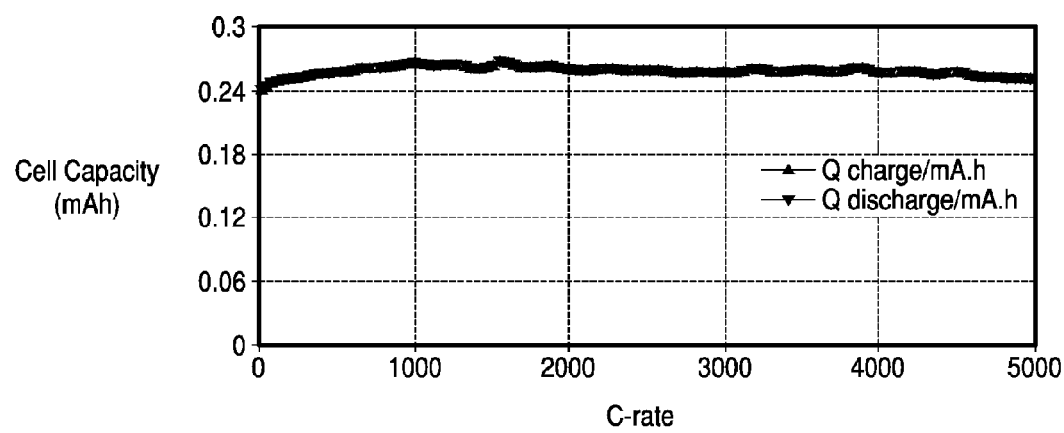
FIG. 17 shows long term cell capacity performance for a cell with Al-doped λ-MnO$_2$ active cathode material versus activated carbon anode material in aqueous Na$_2$SO$_4$ electrolyte over about 5000 cycles.

Further study indicated that the cells are stable and can be cycled repeatedly between 1.8 and 0.8 V, at least. The cells also exhibit excellent long-term stability. FIGS. 12A and 12B show specific energy and specific capacity, respectively, versus cycle number for long term testing (up to 40 cycles). After the formation cycling is complete, a near-100% columbic efficiency is observed. FIG. 12C shows extended high rate cycling performance, with little cell capacity degradation observed over 570 cycles at 5° C. As seen in FIG. 17, such cells exhibit little to no degradation for 1000 or more charge/discharge cycles and less than 10% degradation over 5000 or more cycles, such as 5000 to 10,000 cycles.

Figure 13:
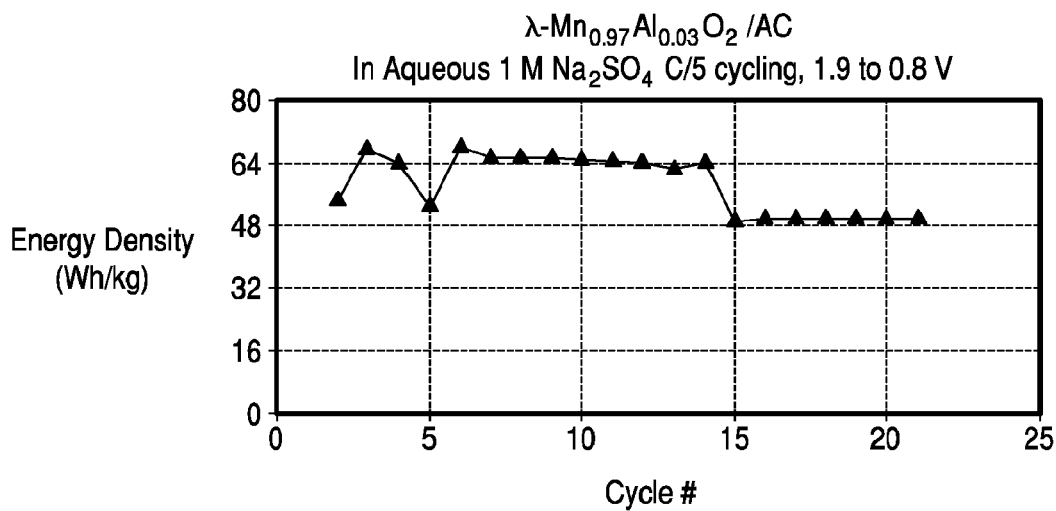
FIG. 13 shows the energy density as a function of cycle number for Al-doped λ-MnO$_2$ active cathode material in aqueous 1 M Na$_2$SO$_4$ electrolyte with C/5 cycling rate across a potential range of 1.9 to 0.8 V.
Figure 14:
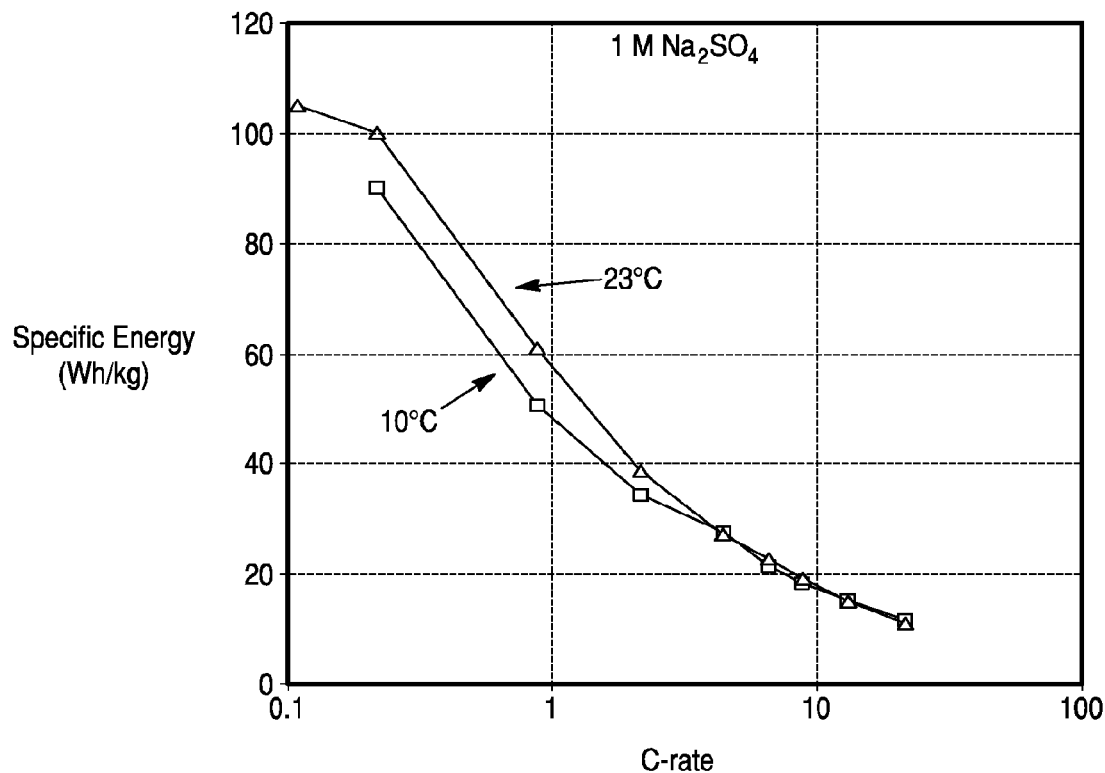
FIG. 14 shows specific energy versus discharge rate for a cell with Al-doped λ-MnO$_2$ active cathode material versus activated carbon anode material in aqueous Na$_2$SO$_4$ electrolyte.
Figure 15:
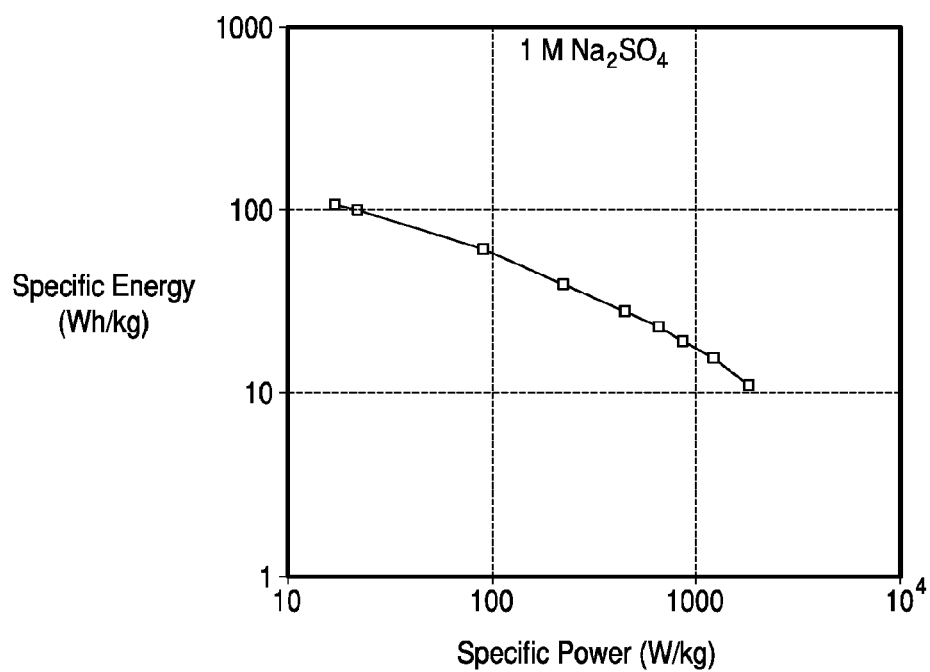
FIG. 15 shows specific energy versus specific power for a cell with Al-doped λ-MnO$_2$ active cathode material versus activated carbon anode material in aqueous Na$_2$SO$_4$ electrolyte.
Figure 16:
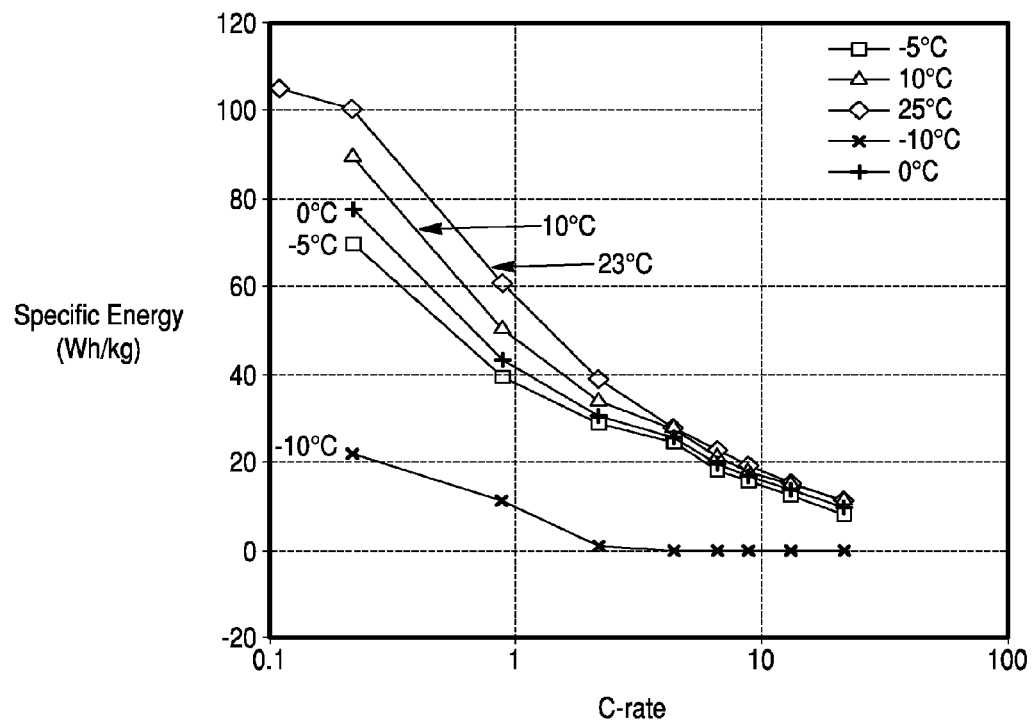
FIG. 16 shows the temperature dependency of specific energy versus discharge rates for cells with Al-doped λ-MnO$_2$ active cathode material versus activated carbon anode material in aqueous Na$_2$SO$_4$ electrolyte.

FIG. 13 shows the energy density of such cells as a function of cycle number, FIG. 14 shows the specific energy versus discharge rate, and FIG. 15 shows the specific energy versus specific power. Finally, temperature dependency studies were conducted. FIG. 16 shows the temperature dependency of the specific energy versus discharge rates for a cell with this active cathode material.

Figure 18:
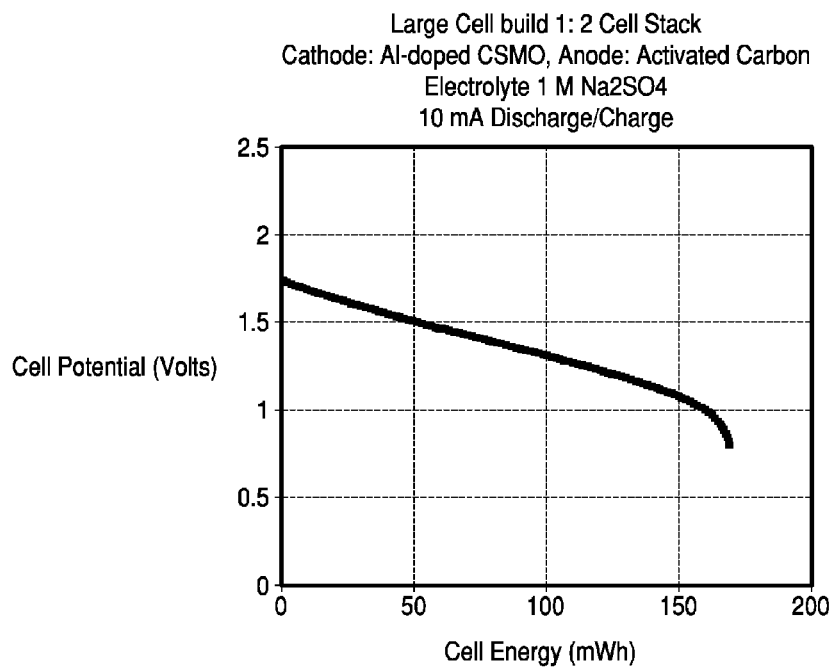
FIG. 18 shows the cell potential versus cell energy for a two cell stack constructed with Al-doped λ-MnO$_2$ active cathode material versus activated carbon anode material in aqueous Na$_2$SO$_4$ electrolyte.

Additionally, a large scale cell (i.e., a two cell stack) was constructed with the active cathode material composite electrode versus an activated carbon anode electrode. The cell potential versus the cell energy is shown in FIG. 18.

Figure 11A:
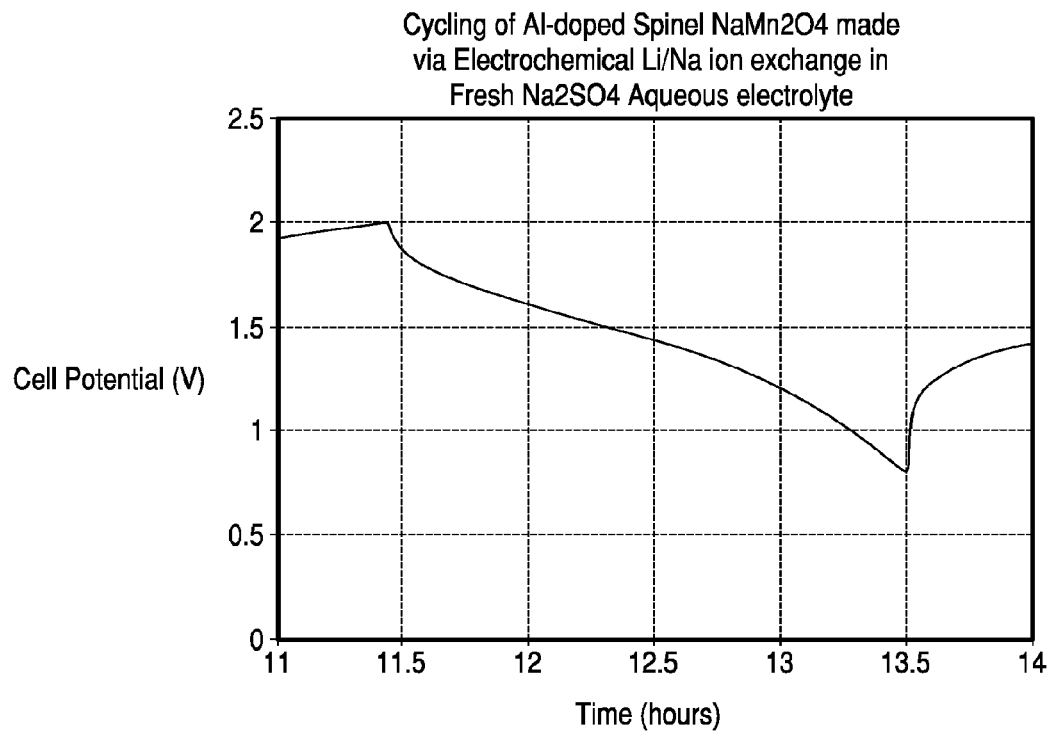
FIGS. 11A and 11B show data showing the cycling performance of Al-doped $\lambda$-$MnO_2$ active cathode material made via electrochemical Li/Na ion exchange in aqueous $Na_2SO_4$ electrolyte from 2.0 to 0.8 V cell potential
Figure 11B:
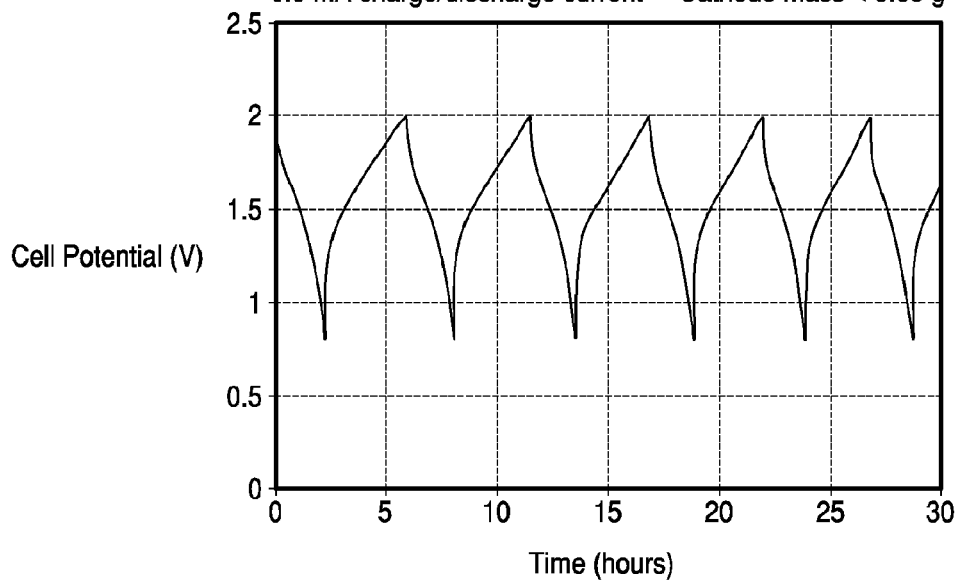

A separate test cell was constructed from a fully de-lithiated, Al doped cubic spinel active cathode material (where Li was removed in a half cell environment described above and replaced with Na electrochemically in a half cell before assembling in the test cell) to demonstrate that this material is fully functional as an active cathode material. Cell cycle characteristics for this cell are shown in FIGS. 11A and 11B. The cell showed significant capacity and a similar characteristic charge discharge profile as the cell where the starting material was Al doped $LiMn_2O_4$, described above.

In the processing of the above active cathode material, Li could have been removed chemically with a Br containing solution followed by washing. Additionally, Na could have also been added to a de-lithiated, cubic spinel active cathode material chemically by treatment with molten Na salt or Na containing solution.

Example 2

A test cell similar to that described in Example 1 above was constructed with a $NaMnO_2$ (birnassite structure) active cathode material, activated carbon anode material, and 1 M $Na_2SO_4$ in DI $H_2O$ electrolyte.

Figure 19:
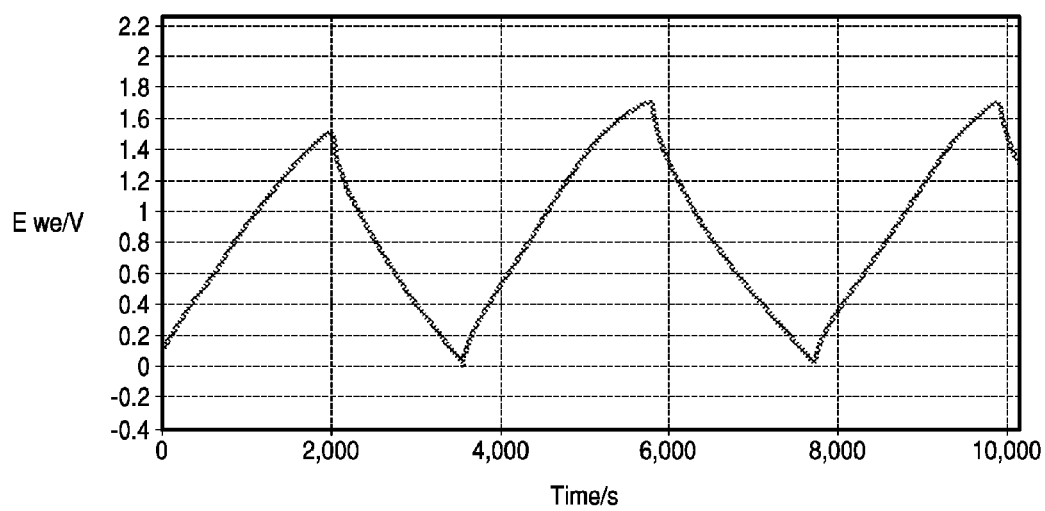
FIG. 19 shows the charge/discharge behavior (i.e., cell potential versus time through charge/discharge cycles) of a full aqueous Na-ion hybrid energy storage device based on a NaMnO$_2$ (birnassite phase) active cathode material in aqueous Na$_2$SO$_4$ electrolyte.

FIG. 19 shows the charge/discharge behavior (i.e., cell potential versus time through charge/discharge cycles) of the $NaMnO_2$ (birnassite phase) active cathode material test cell. The system demonstrated a potential range of about 0.0 V to about 1.7 V.

Example 3

Figure 20A:
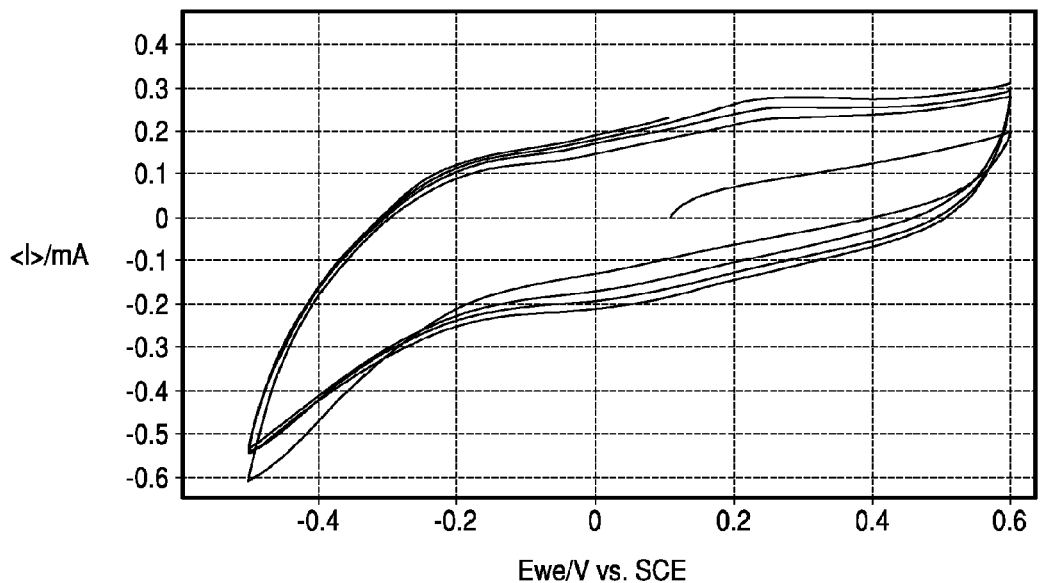
FIG. 20A shows data from four sequential cyclic voltammograms for Na$_2$Mn$_3$O$_7$ active cathode material in aqueous Na$_2$SO$_4$ electrolyte solution.
Figure 20B:
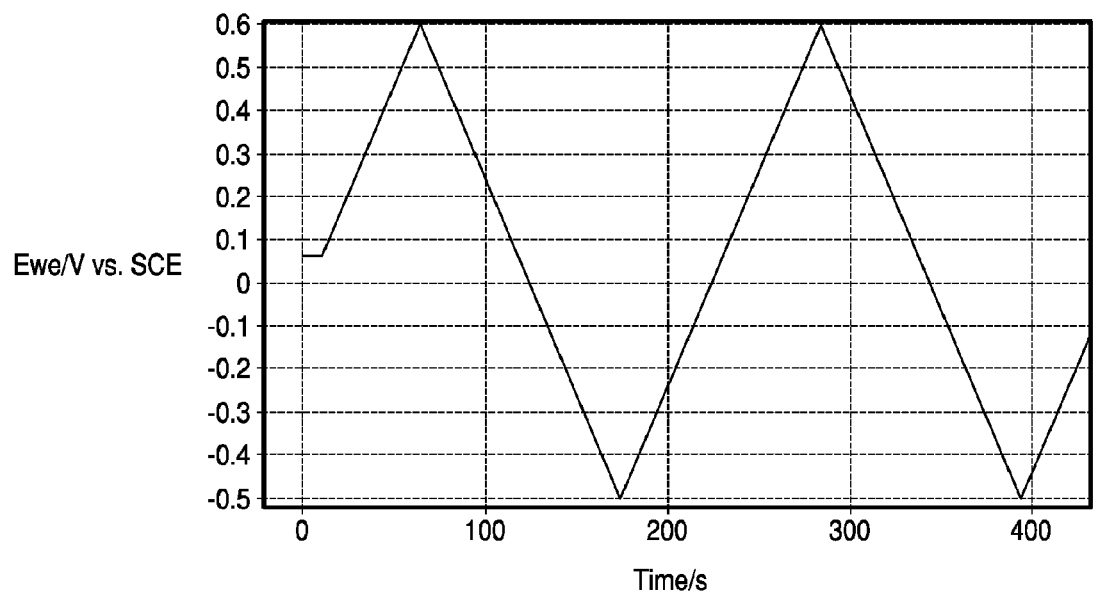
FIG. 20B shows a potential versus time profile from a portion of the cyclic voltammogram testing shown in FIG. 20A.

A half cell similar to that described in Example 1 above was constructed with a $Na_2Mn_3O_7$ (JCPDS structure: 078-0193) working electrode, a SCE reference electrode, and a Pt counter electrode. The half-cell was cycled between about −0.5 and 0.6 V vs. SCE. The data indicate that $Na_2Mn_3O_7$ does display Na cation intercalation/deintercalation events and is stable between the potential range studied. The data shown in FIG. 20A show cyclic voltammargrams which demonstrate reversible capacity for $Na_2Mn_3O_7$ in 1 M $Na_2SO_4$ in DI $H_2O$ electrolyte solution. FIG. 20B shows a potential versus time profile from a portion of the same test.

Results of these studies indicate that $Na_2Mn_3O_7$ is a suitable active cathode material for use in embodiments of the present invention.

Example 4

Figure 21:
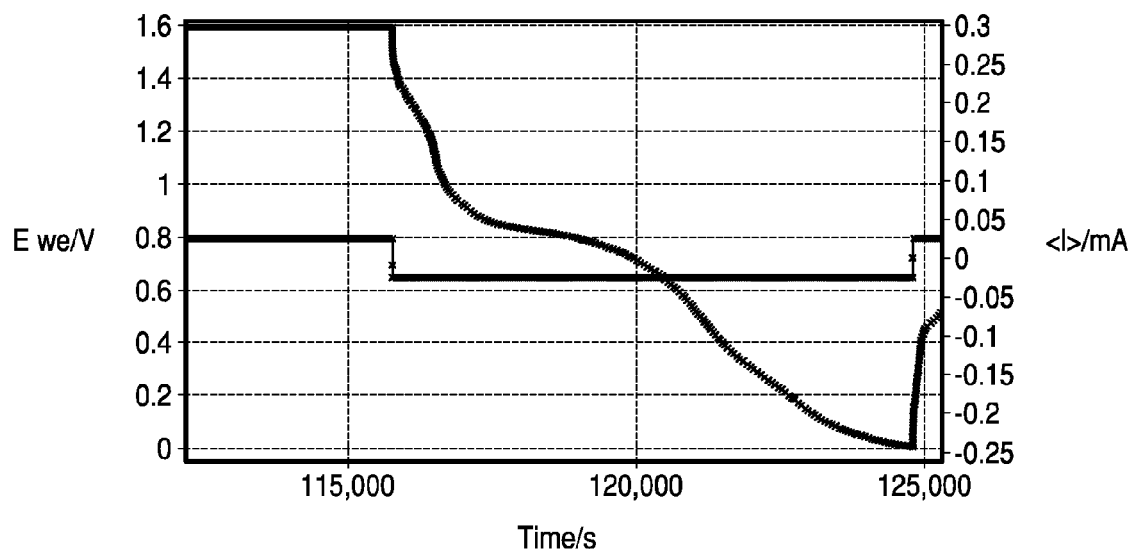
FIG. 21 shows discharge behavior of a test cell with a Na$_2$FePO$_4$F active cathode material, an activated carbon anode material, and aqueous Na$_2$SO$_4$ electrolyte.

A test cell similar to that described in Example 1 above was constructed with a $Na_2FePO_4F$ active cathode material, activated carbon anode material, and 1 M $Na_2SO_4$ in DI $H_2O$ electrolyte. FIG. 21 shows the discharge behavior of the test cell over time. As seen in FIG. 21, significant capacity was observed at about 0.8 V.

Example 5

Figure 22:
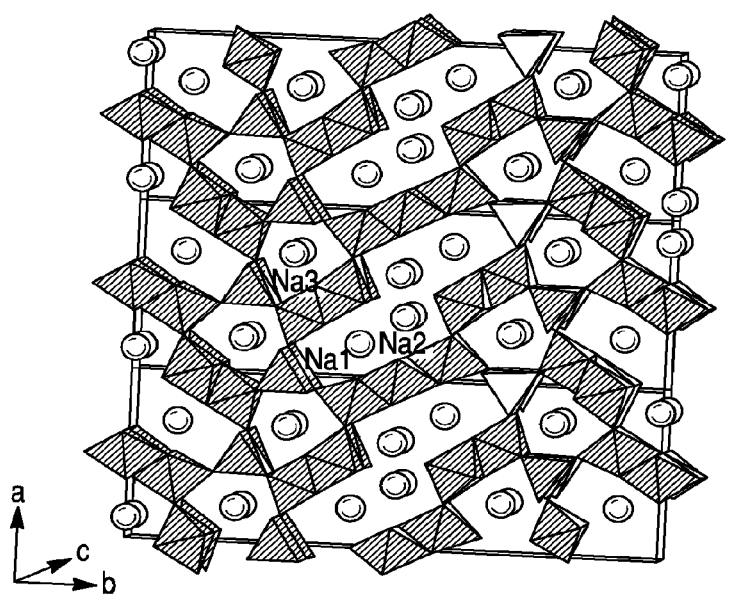
FIG. 22 shows a structural representation of the crystal structure of Na$_{0.44}$MnO$_2$ perpendicular to the ab plane.

A test cell and a half cell similar to those described in Example 1 were constructed with $Na_{0.44}MnO_2$ active cathode material. The $Na_{0.44}MnO_2$ active cathode material was as synthesized by thoroughly mixing $Na_2CO_3$ and $Mn_2O_3$ to proper molar ratios and firing at 800° C. for 12 hours. The degree of Na content during firing determines the oxidation state of the Mn and how it bonds with $O_2$ locally. This material is known to cycle between $0.33<x<0.66$ for $Na_xMnO_2$ in a Na cation containing non-aqueous electrolyte. The specific capacity of this material is as much as 160 mAh/g in an organic electrolyte, with a voltage of 2 to 3 V vs. Na metal. A structural representation of the crystal structure is shown in FIG. 22.

A composite cathode was formed according to a similar procedure as outlined in Example 1. In this case, 80 wt % $Na_{0.44}MnO_2$, 15 wt % carbon black conductive diluent, and 5 wt % PTFE polymeric binder were mixed and pressed into a pellet. The redox potential associated with Na-ion intercalation/deintercalation is below the breakdown potential (oxygen reduction) of water, demonstrating that the material is suitable for use with an aqueous electrolyte.

Activated carbon was used as the anode material. This material is known to reversibly store Li cations through surface adsorption/desorption and have sufficient capacity in the desired voltage range. It was anticipated that this material could store between 40 and 100 mAh/g of $Na^+$ in the voltage range of 1.5 to 2 V vs. Na metal.

A composite anode was formed according to a similar procedure as outlined in Example 1. In this case, 80 wt % activated carbon, 15 wt % carbon black conductive diluent, and 5 wt % PTFE polymeric binder were mixed and pressed into a pellet.

The electrolyte for the half cell was 2 N $Na_2SO_4$ in DI $H_2O$, and for the test cell was 1.5 M $Na_2SO_4$ in DI $H_2O$. Other work has shown that the same effect is present in salt concentrations ranging from 0.05 to 5 M.

The reversible nature of the $Na_{0.44}MnO_2$ active cathode material was examined using a three electrode half-cell setup, with the pressed composite $Na_{0.44}MnO_2$ electrode affixed to Ni mesh and immersed into an open beaker of electrolyte. A standard sulfur-mercury electrode was used (Koslow scientific) as a reference electrode, and Pt wire as a counter electrode.

Figure 23:
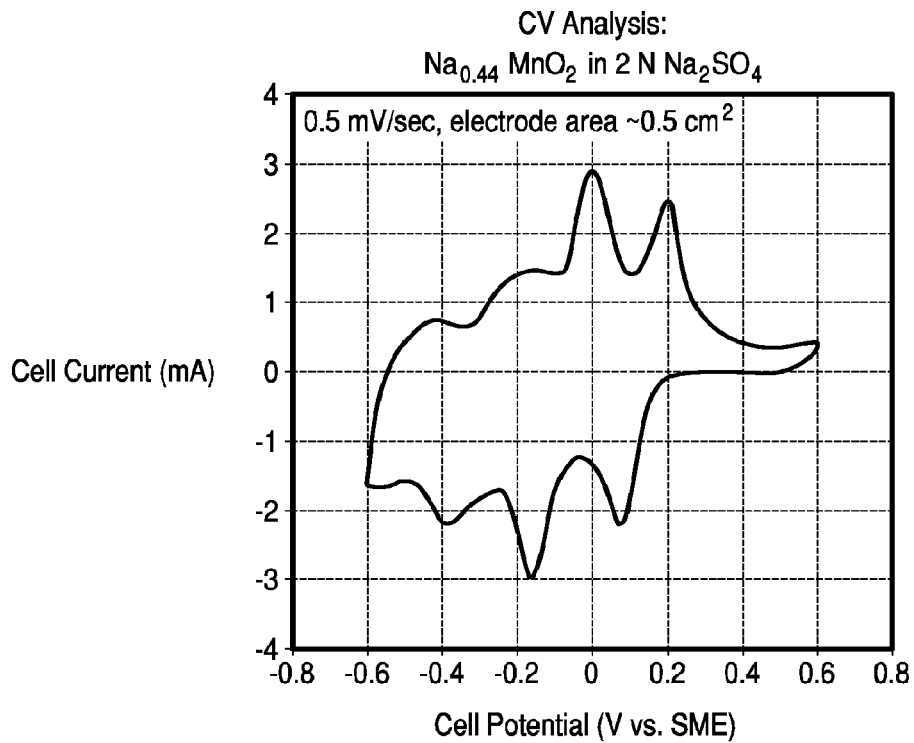
FIG. 23 shows a cyclic voltammogram of a composite Na$_{0.44}$MnO$_2$ electrode in an aqueous Na$_2$SO$_4$ electrolyte.

As can be seen in the cyclic voltammogram shown in FIG. 23, the secondary nature of the material is evident, as is a capacitive element likely due to surface area effects related to the carbon black used when fabricating the composite $Na_{0.44}MnO_2$ electrode. There are four distinct reduction-oxidation peaks evident for this material. The symmetrical nature of this material is indicative of the fact that Na is inserted (under negative current conditions) and extracted (under positive current conditions) in a repeatable fashion.

Figure 24:
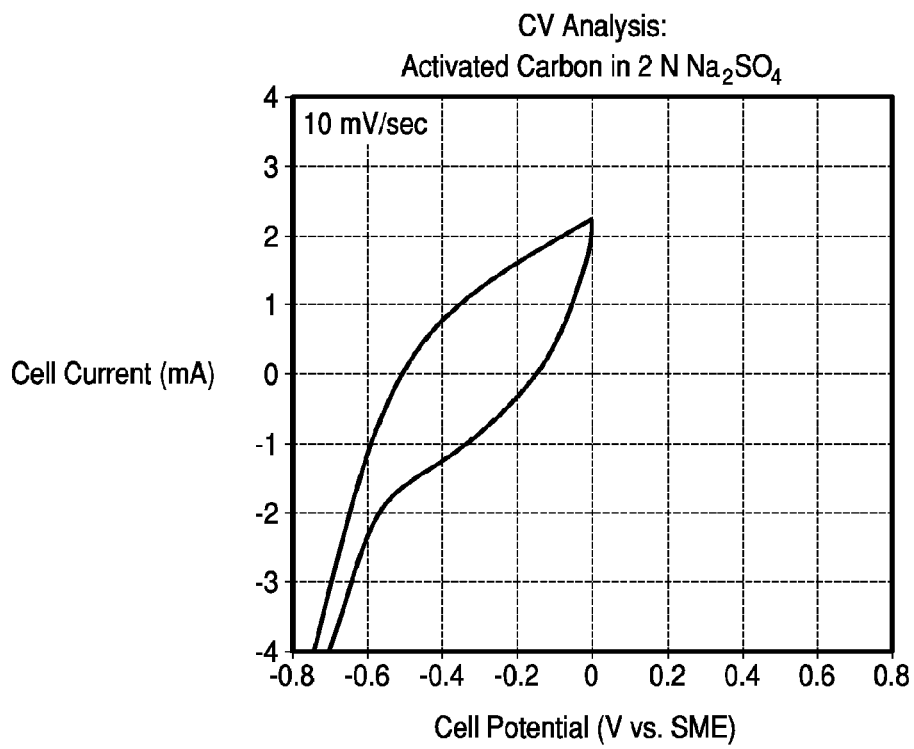
FIG. 24 shows a cyclic voltammogram of a composite activated carbon electrode in an aqueous Na$_2$SO$_4$ electrolyte.

A similar half-cell test was conducted for an activated carbon electrode in 2 N $Na_2SO_4$ in DI $H_2O$ electrolyte solution. The cyclic voltammogram derived from this electrode demonstrate that there are no distinct oxidation-reduction peaks in aqueous $Na_2SO_4$ solution; however, symmetrical behavior was observed above about −0.6 V versus SME. This is indicative of a reversible Na cation storage process via surface adsorption. At voltages below −0.6 V, tailing was observed due to hydrogen evolution. The data is shown in FIG. 24.

These two half-cell tests verify that the anode and cathode materials are functional in the desired aqueous environment and should be compatible with each other, as long as the cell is not over charged or over discharged, at which point water electrolysis would occur.

Figure 25:
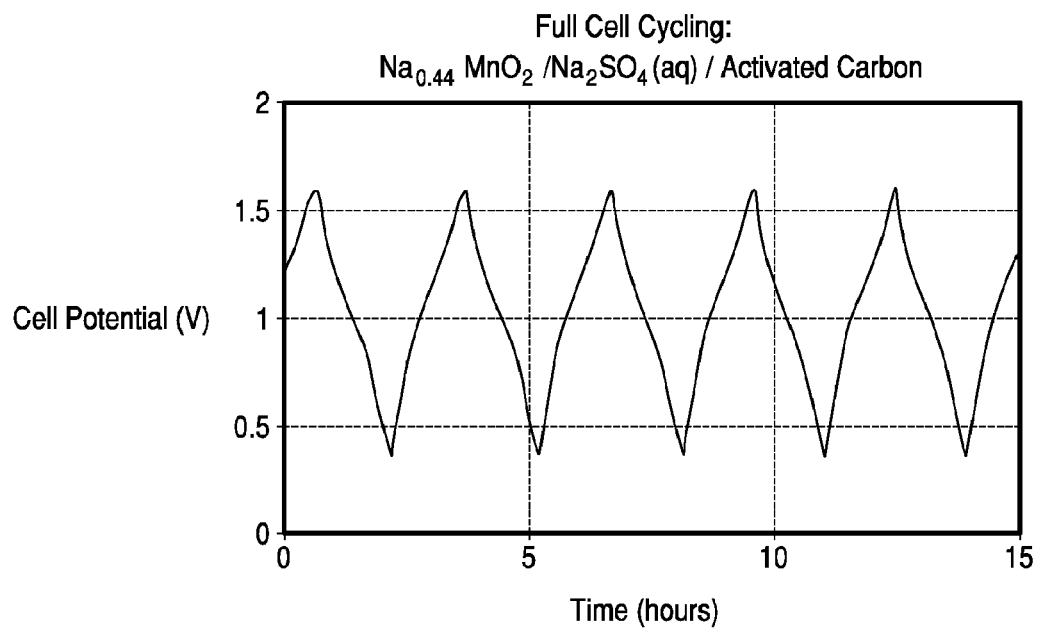
FIG. 25 shows charge/discharge behavior of a composite Na$_{0.44}$MnO$_2$/Na$_2$SO$_{4(aq)}$/composite activated carbon hybrid electrical energy storage device through five cycles over about 15 hours.

A series of the full cells similar to those described in Example 1 was then made and tested for a composite $Na_{0.44}MnO_2$ cathode, composite activated carbon anode, and aqueous $Na_2SO_4$ electrolyte. After some irreversible capacity loss on the formation cycle(s), typical charge/discharge behavior was very consistent and was stable in the voltage range between 0.35 and 1.8 V, at least, as seen in FIG. 25. The cells demonstrated little obvious decay over about 15 hours.

Figure 26:
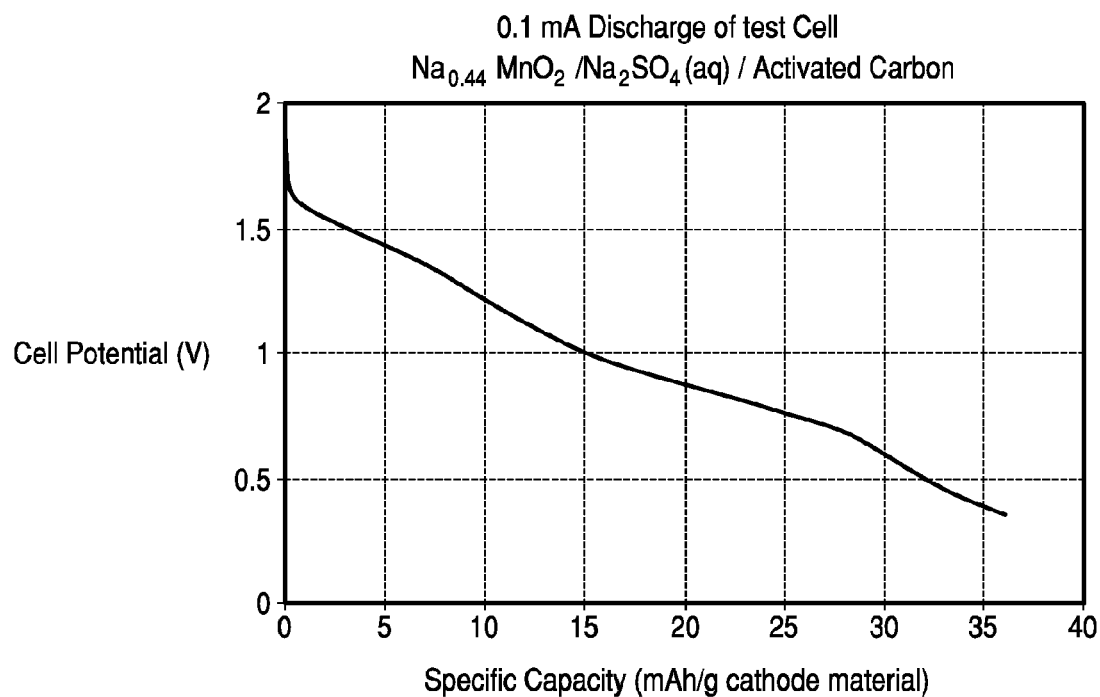
FIG. 26 shows specific capacity across a typical discharge cycle of a composite Na$_{0.44}$MnO$_2$/Na$_2$SO$_{4(aq)}$/composite activated carbon hybrid electrical energy storage device.
Figure 27:
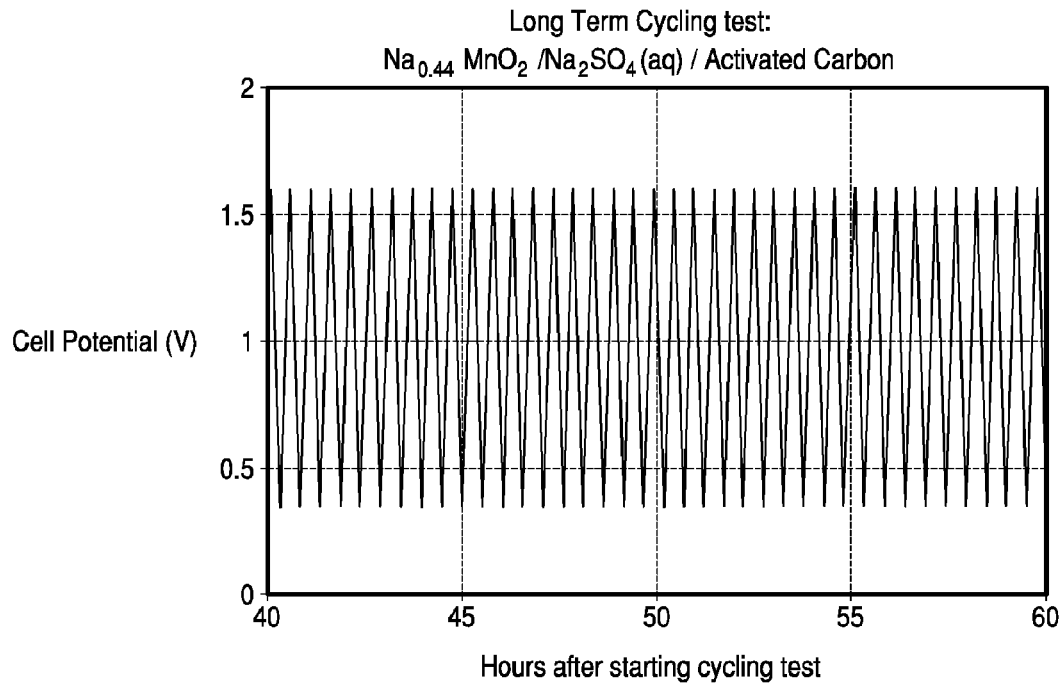
FIG. 27 shows long-term charge/discharge behavior of a composite Na$_{0.44}$MnO$_2$/Na$_2$SO$_{4(aq)}$/composite activated carbon hybrid electrical energy storage device after 40 continuous hours of testing to about 60 continuous hours of testing.
Figure 28:
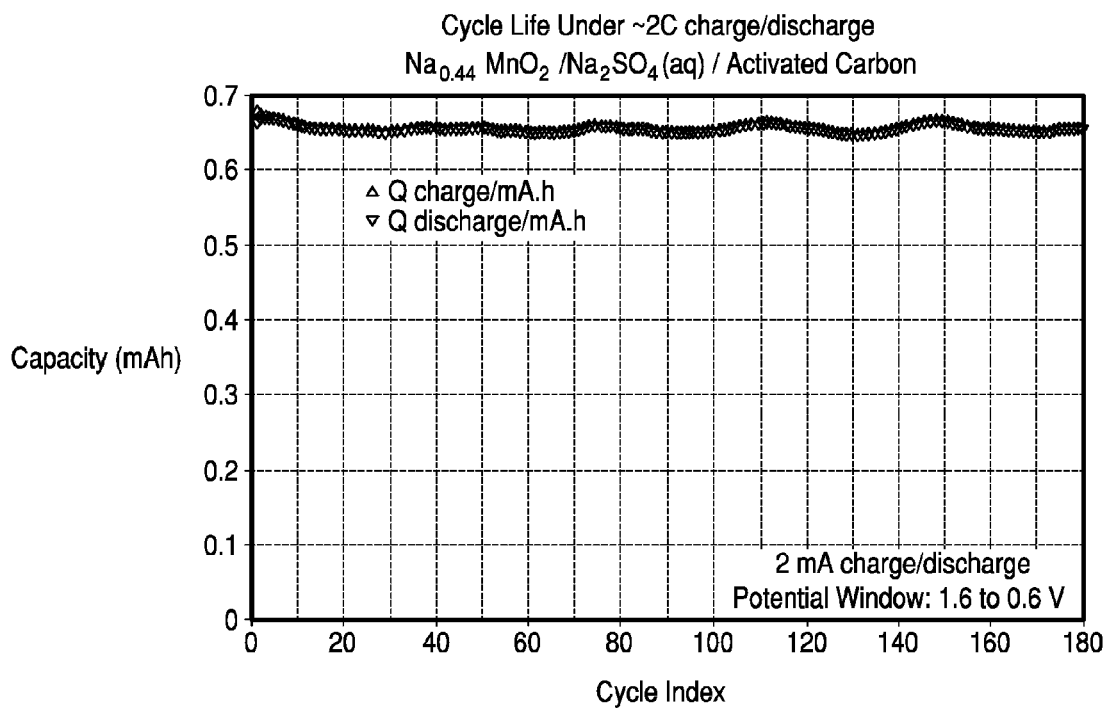
FIG. 28 shows a plot of charge and discharge capacity as a function of cycle for a composite Na$_{0.44}$MnO$_2$/Na$_2$SO$_{4(aq)}$/composite activated carbon hybrid electrical energy storage device over 180 cycles.

Though the system under observation was not optimized, over 20 mAh/g (from the cathode) were delivered over many cycles. It is believed that this value may be significantly increased by optimizing composite electrode structure. A typical discharge curve is shown in FIG. 26. A specific capacity between 15 and 36 mAh/g was observed for between 1.0 and 0.4 V cell potential. Further study indicated that the cells are stable and can be cycled repeatedly to 1.8 V, at least. The cells also exhibit excellent long-term stability. FIG. 27 shows a portion of a long-duration cycle-life test. The cycle life behavior of this cell shows that there was no degradation over at least 180 cycles (over at least 40 continuous hours of testing) between 0.4 and 1.6 V cell potential. Charge and discharge capacity under about a 2C charge/discharge rate (at 2 mA charge/discharge and from 1.6 to 0.6 V potential window) are shown as a function of cycle in FIG. 28. In these tests, columbic efficiency was observed to be greater than 90% even at these high current rates.

The charge and discharge energy of these cells is shown in FIG. 29 as a function of cycle index. Minimal system fade was observed over the first 180 cycles, and even at a rate of greater than 2 C, the cell delivered a roundtrip energy efficiency of over 85% (about 87%). Efficiency would increase significantly at lower rates of charge/discharge, because nearly all efficiency loss is due to overpotential loss at higher currents.

Example 6

Another test cell similar to that described in Example 1 was constructed with $Na_{0.44}MnO_2$ active cathode material and hydrated $NaMnO_2$ (birnassite) as a binder material. The $Na_{0.44}MnO_2$ active cathode material was synthesized as described in Example 5.

The composite cathode was formed according to a similar procedure as outlined in Example 1. In this case, 80 wt % $Na_{0.44}MnO_2$, 15 wt % carbon black conductive diluent, and 5 wt % hydrated $NaMnO_2$ (birnassite) binder were mixed and pressed into a pellet.

Figure 30A:
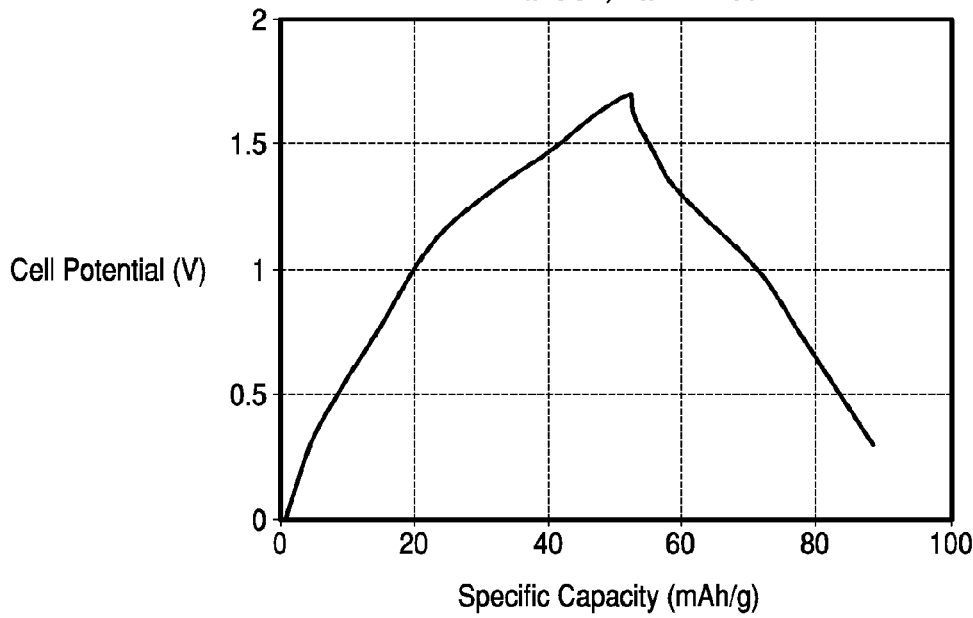
FIG. 30A shows cell potential versus specific capacity for a full aqueous Na-ion hybrid energy storage device based on a composite Na$_{0.44}$MnO$_2$ cathode (made with hydrated NaMnO$_2$ (birnassite) as a binder) in aqueous Na$_2$SO$_4$ electrolyte.
Figure 30B:
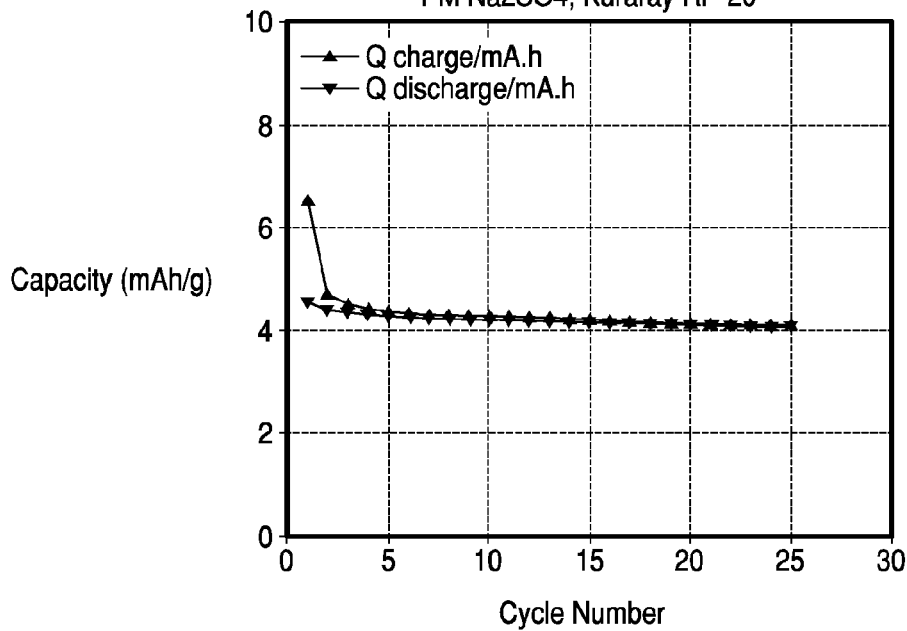
FIG. 30B shows specific capacity versus cycle number for long term testing (over about 25 cycles) of a full aqueous Na-ion hybrid energy storage device based on a composite Na$_{0.44}$MnO$_2$ cathode (made with hydrated NaMnO$_2$ (birnassite) as a binder) in aqueous Na$_2$SO$_4$ electrolyte.

Performance data of this test cell is shown in FIGS. 30A and 30B. Specifically, FIG. 30A shows a plot of the cell potential versus specific capacity, and FIG. 30B shows the capacity versus cycle number for long term testing (over about 25 cycles).

The foregoing description of the invention has been presented for purposes of illustration and description. The methods and devices illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. It is intended that the scope of the invention be defined by the claims appended hereto, and their equivalents. All references described here are incorporated herein in their entirety.

What is claimed is:

1. A method of operating hybrid aqueous energy storage device comprising an anode electrode, a cathode electrode comprising an undoped tunnel-structured orthorhombic $Na_4M_9O_{18}$ active cathode material, wherein M comprises manganese, a separator, and a sodium containing aqueous electrolyte, the method comprising deintercalating sodium ions from an active cathode electrode material during initial charging of the device, reversibly intercalating sodium ions into the active cathode electrode material during discharge cycles, and deintercalating sodium ions from the active cathode electrode material during subsequent charge cycles, wherein the anode electrode comprises an activated carbon active anode material;

wherein:
the electrolyte pH is between 7 and 8;
the anode electrode further comprises a polytetrafluoroethylene (PTFE) binder;
the cathode electrode further comprises a polytetrafluoroethylene (PTFE) binder and a carbon black diluent;
the separator comprises a cotton sheet separator;
the anode electrode comprises 10 weight percent of the polytetrafluoroethylene (PTFE) binder and 90 weight percent of the activated carbon active anode material;
the cathode electrode comprises 10 weight percent of the polytetrafluoroethylene (PTFE) binder, 10 weight percent of the carbon black diluent, and 80 weight percent of the undoped tunnel-structured orthorhombic $Na_4Mn_9O_{18}$ active cathode material; and
the electrolyte consists of 1M $Na_2SO_4$ solvated in deionized water.

* * * * *